(12) United States Patent
Liu

(10) Patent No.: US 9,982,663 B2
(45) Date of Patent: May 29, 2018

(54) ELECTROOSMOTIC PUMP UNIT AND ASSEMBLY

(71) Applicant: The Board of Regents of the University of Oklahoma, Norman, OK (US)

(72) Inventor: Shaorong Liu, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 721 days.

(21) Appl. No.: 14/511,860

(22) Filed: Oct. 10, 2014

(65) Prior Publication Data

US 2015/0101930 A1    Apr. 16, 2015

Related U.S. Application Data

(60) Provisional application No. 61/889,897, filed on Oct. 11, 2013.

(51) Int. Cl.
*F04B 19/00* (2006.01)
*F04B 19/04* (2006.01)
*B01D 61/42* (2006.01)

(52) U.S. Cl.
CPC .......... *F04B 19/006* (2013.01); *B01D 61/427* (2013.01); *F04B 19/04* (2013.01)

(58) Field of Classification Search
CPC ...... B01D 61/427; B01D 57/00; B01D 57/02; B01D 59/42; F04B 19/006; F04B 19/04; B01L 2400/0421; B01L 2300/0645; B01L 3/5027; B01L 2400/0415; B01L 2400/0424; B01L 2400/0427; B01J 2219/00135; C01B 2203/085; G01N 27/4473; G01N 27/44791; G01N 27/447; G01N 27/44747;

(Continued)

(56) References Cited

U.S. PATENT DOCUMENTS 3,923,426 A * 12/1975 Theeuwes ............. B01D 61/56
                                                            204/630
6,012,902 A *  1/2000 Parce ................... B01L 3/50273
                                                            417/48

(Continued)

OTHER PUBLICATIONS

Journal of Chromatography Library—vol. 62, capillary electrochromatography, editied by Z. Deyl and F Sevc, 2001, pp. 202 and 203.*

(Continued)

*Primary Examiner* — Patrick Hamo
(74) *Attorney, Agent, or Firm* — Dunlap Codding, P.C.

(57) ABSTRACT

An electroosmotic pump unit includes at least a first pump element, at least a second pump element, and an electrode. Each pump element includes a tube, an electrically grounded fluid inlet, a fluid outlet electrically coupled to the electrode, and a porous monolith immobilized in the tube and having open pores having net surface charges. When the electrode applies a voltage across the monoliths, a fluid supplied to the first pump element flows through the pump elements in a direction from a fluid inlet of the first pump element toward a fluid outlet of the second pump element. A plurality of electroosmotic pump units may be connected in series in a pump assembly. The electroosmotic pump unit, or pump assembly, may be connected to an apparatus such as a HPLC.

25 Claims, 20 Drawing Sheets

(58) Field of Classification Search
CPC ........... G01N 33/561; G01N 27/44756; G01N 27/453; C02F 1/4696; C07K 1/24; C12N 15/101; C12Q 2565/125
USPC ............... 204/600, 450, 601; 417/48, 50
See application file for complete search history.

(56) References Cited

U.S. PATENT DOCUMENTS

| | | | | |
|---|---|---|---|---|
| 6,013,164 | A * | 1/2000 | Paul | F04B 19/006 204/450 |
| 6,277,257 | B1 * | 8/2001 | Paul | F04B 19/006 204/450 |
| 6,619,925 | B2 * | 9/2003 | Ohkawa | F04B 17/00 204/600 |
| 6,632,619 | B1 * | 10/2003 | Harrison | B01J 19/0093 422/504 |
| 7,316,543 | B2 * | 1/2008 | Goodson | F04B 19/006 204/454 |
| 2005/0016853 | A1 * | 1/2005 | Paul | F04B 19/006 204/600 |
| 2006/0127238 | A1 * | 6/2006 | Mosier | B01L 3/0293 417/313 |
| 2009/0191073 | A1 * | 7/2009 | Kopecek | F04B 17/04 417/415 |
| 2009/0266762 | A1 * | 10/2009 | Ito | B01D 61/025 210/636 |
| 2010/0034667 | A1 * | 2/2010 | Khamizov | F04B 19/006 417/48 |
| 2013/0041353 | A1 * | 2/2013 | Shin | A61M 5/14248 604/892.1 |

OTHER PUBLICATIONS

He, Chiyang, et al., "Flow Batteries for Microfluidic Networks: Configuring an Electroosmotic Pump for Nonterminal Positions," *Analytical Chemistry*, 2011, 83 (7), pp. 2430-2433.

Lu, Joann J., et al., "Chip-Capillary Hybrid Device for Automated Transfer of Sample Preseparated by Capillary Isoelectric Focusing to Parallel Capillary Gel Electrophoresis for Two-Dimensional Protein Separation," *Analytical Chemistry*, 2012, 84 (16), pp. 7001-7007.

Gu, Congying, et al., "Miniaturized Electroosmotic Pump Capable of Generating Pressures of More than 1200 Bar," *Analytical Chemistry*, 2012, 84 (21), pp. 9609-9614.

Zhu, Zaifang, et al., "Integrated Bare Narrow Capillary-Hydrodynamic Chromatographic System for Free-Solution DNA Separation at the Single-Molecule Level," *Angewandte Chemie*, 2013, 52 (21), pp. 5612-5616.

* cited by examiner

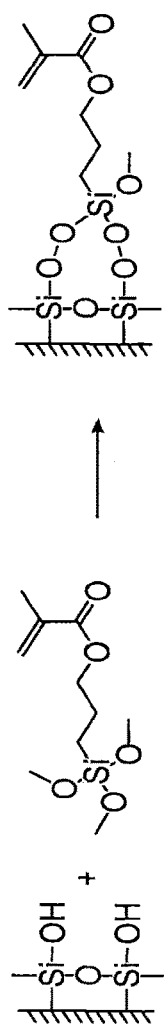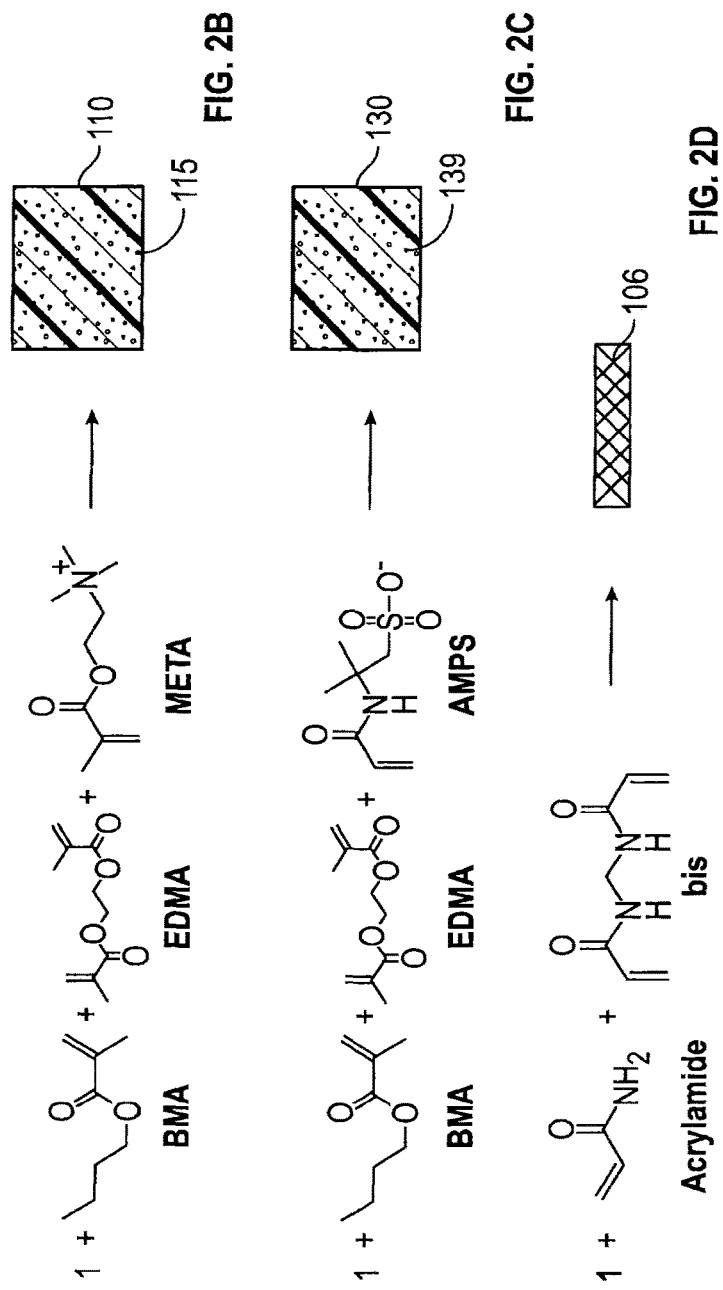
FIG. 2A
FIG. 2B
FIG. 2C
FIG. 2D

ELECTROOSMOTIC PUMP UNIT AND ASSEMBLY

CROSS REFERENCE TO RELATED APPLICATIONS

This application claims priority to U.S. Provisional Application Ser. No. 61/889,897, filed Oct. 11, 2013, the entire content of which is hereby expressly incorporated herein by reference.

STATEMENT REGARDING FEDERALLY SPONSORED RESEARCH OR DEVELOPMENT

This invention was supported by Department of Energy under DE-SC0006351, and the National Science Foundation under CHE-1011957. The United States government has certain rights in this invention.

BACKGROUND

The ability of micropumps to generate high-pressures is appealing because it enables integration of a complete high performance liquid chromatographic (HPLC) system on a lab-on-a-chip (LOC) platform. HPLC is arguably the most commonly utilized separation technique for chemical analysis. HPLC can analyze 80% of all known compounds and it is widely used from drug compound screening to medicine production, from clinical diagnosis to food quality examination, and from environmental protection to space exploration, for example. Miniaturizing a HPLC system is of great significance because these systems also allow samples to be analyzed at the point of need rather than a centralized laboratory. LOC devices provide a new class of research tools for the investigation of life processes and drug discovery. Currently, few existing micropumps can produce adequate pumping pressure for LOC HPLC applications.

Numerous micropumps have been developed. The electroosmotic pump (EOP) has emerged as one of the most promising candidates that have shown potential for practical HPLC separations. EOPs have several inherent advantages over other types of micropumps. For example, EOPs are capable of generating pulse-free flows, EOP flow magnitude and direction are convenient to control, EOPs can be fabricated using standard microfabrication technologies (and thus are readily integratable with LOC devices), and EOPs have no moving parts.

The first EOP was developed in early 1970's when a 5-cm-long and 1-mm-inner diameter (i.d.) glass column was packed with 1-20 µm silica particles to create electroosmotic flow (EOF) to drive HPLC separations. The working pressure of this pump was about 40 bars. A capillary packed with 1-3 µm silica beads was used to generate EOF, and the maximum pressure created was about 350 bars. Parallel columns packed with 2-3 µm silica beads produced a maximum pressure of about 150 bars. Polymer and silica-based monolithic and open capillary EOP's have also been developed, but pressures produced by these pumps were rarely over 100 bars.

Another previously developed configuration of EOP relies on open capillaries and includes a first EOP pump unit made from open capillaries coated with a positively-charged polymer, and a second EOP pump unit made from open capillaries coated with a negatively-charged polymer. The pump units can be joined or coupled in series to enhance pumping pressures, and a maximum pressure of about 200 bars has been achieved with such open capillary EOPs. However, due to the typical pressures used in HPLC separations, multiple open capillaries have to be utilized in parallel to produce adequate flow to drive HPLC separations.

BRIEF DESCRIPTION OF THE DRAWINGS

Like reference numerals in the figures represent and refer to the same element or function. The figures are not necessarily to scale and certain features and certain views of the figures may be shown exaggerated in scale or in schematic in the interest of clarity and conciseness. Implementations of the inventive concepts disclosed herein may be better understood when consideration is given to the following detailed description thereof. Such description makes reference to the annexed pictorial illustrations, schematics, graphs, drawings, and appendices. In the drawings:

FIGS. 2A-2D are diagrams of a method of manufacturing an electroosmotic pump unit according to the inventive concepts disclosed herein.

DETAILED DESCRIPTION

Figure 1:
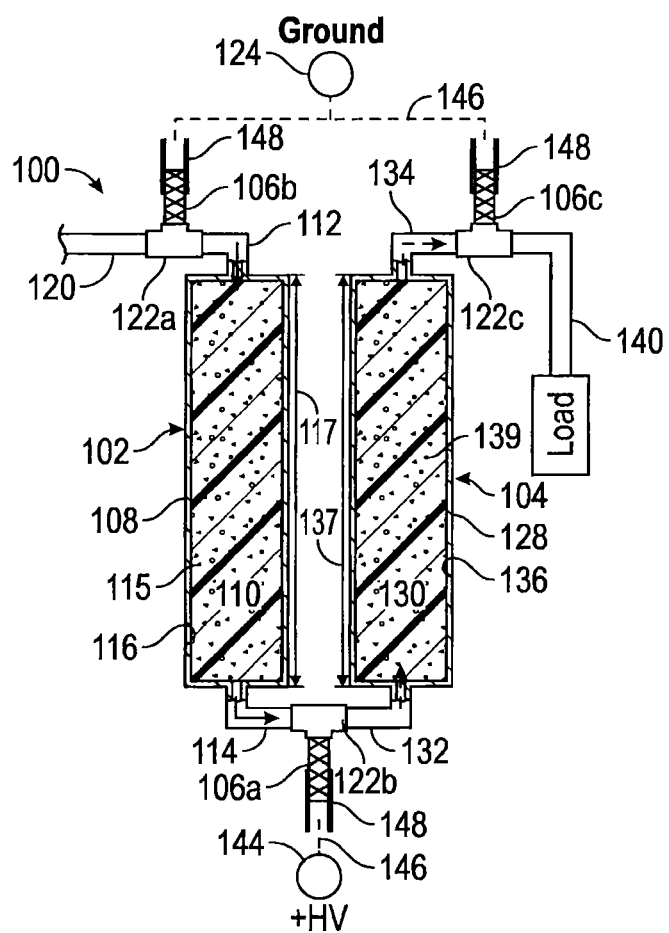
FIG. 1 is a diagram of an electroosmotic pump unit according to an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description and examples herein or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting.

In the following detailed description of embodiments of the inventive concepts disclosed herein, numerous specific details are set forth in order to provide a more thorough understanding of embodiments of the inventive concepts. However, it will be apparent to one of ordinary skill in the art that the inventive concepts disclosed herein may be practiced without these specific details. In other instances, well-known features have not been described in detail to avoid unnecessarily complicating the instant disclosure.

Further, several embodiments of the presently disclosed inventive concepts are hereby illustrated in the appended drawings. It is to be noted however, that the appended drawings only illustrate several typical embodiments and are therefore not intended to be considered limiting of the scope of the presently disclosed inventive concepts.

All of the devices, apparatus, compositions, and/or methods disclosed herein can be made and executed using bi-fabrication techniques without undue experimentation in light of the present disclosure. While the apparatus, compositions and methods of this disclosure have been described in terms of particular embodiments, it will be apparent to those of skill in the art that variations may be applied to the compositions and/or methods and in the steps or in the sequence of steps of the method described and/or claimed herein without departing from the concept, spirit and scope of the disclosure. All such similar substitutes and modifications apparent to those skilled in the art are deemed to be within the spirit, scope and concept of the inventive concepts as disclosed and/or claimed herein.

Where used herein, the term "plurality" refers to "two or more." The singular forms "a," "an," and "the" include plural referents unless the context clearly indicates otherwise. As used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 100, 100a, 100b, etc.). Such shorthand notations are used for purposes of clarity and convenience only, and should not be construed to limit the inventive concepts disclosed herein in any way, unless expressly stated to the contrary.

Further, unless expressly stated to the contrary, "or" refers to an inclusive or (i.e., "and/or") and not to an exclusive or. For example, a condition A or B is satisfied by anyone of the following: A is true (or present) and B is false (or not present), A is false (or not present) and B is true (or present), and both A and B are true (or present). For example, "A or B" may refer to either A or B, or both A and B. Also, the terms "comprise", "comprised", and "comprising" and the terms "include", "included", and "including" may be used interchangeably herein and are to be afforded the widest interpretation.

As used herein the qualifiers "about," "approximately," and "substantially" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The term "about" or "approximately", where used herein when referring to a measurable value such as an amount, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where used herein, "a polymeric porous material provided with open pores", also referred to as a "monolith", is intended to refer to a material (e.g., a solid material) provided with (i.e., having) a plurality of interconnected open pores. The polymeric porous material may include surfaces having pitches, openings, or pots connected to the plurality of open pores. Where used herein, the term "bi-Egg" refers to a binary (double monolith) EOP gradient generator. EOP refers to electroosmotic pump. In certain embodiments, the monolith material is prepared by polymerization of a monomer solution. In certain embodiment, polymerization is conducted under pressure (such as but not limited to about 50 psi to about 1500 psi, for example about 1000 psi). Monoliths formed under pressure have smaller pores and lower porosities, for example, but not by way of limitation, effective pore diameters in a range of about 400 nm to about 500 nm and porosities of around 30% to 40%. Pore size can be further manipulated by adjusting the porogen quantities (e.g., 1-propanol and 1,4-butanediol).

In certain embodiments, the inventive concepts disclosed herein are directed to EOP units and to assemblies constructed with EOP units and methods of their use, for example in chromatographic applications such as HPLC. EOP units according to the inventive concepts disclosed herein have a pair of pump elements each having a capillary tube containing a charged monolith material (i.e., a "positively charged" (positive) monolith and a "negatively charged" (negative) monolith) fluidly coupled to one another and electrically coupled to an electrode so that an external voltage applied across the monoliths causes electroosmotic flow through the EOP unit. In one embodiment, the electrode is bubbleless (bubbles are not created during operation). The positive monolith is formed of a polymeric porous material provided with a plurality of open pores having net positive surface charges. The positive monolith is immobilized within a first capillary tube, for example, by being at least partially bonded to an internal surface of the first capillary tube or enclosed within the capillary tube. Similarly, the negative monolith is formed of a porous polymeric material provided with a plurality of open pores having net negative surface charges. The negative monolith is immobilized within a second capillary tube, for example, by being at least partially being bonded to an internal surface of the second capillary tube, which is fluidly coupled with the first capillary tube containing the positive monolith. The porous polymeric materials allow electroosmotic fluid flow through the monoliths via arrays of dense narrow open pores having net positive or net negative surface charges.

Pumping pressures generated by EOP units according to the inventive concepts disclosed herein may approach a sum of the pressures generated by the positive monolith and the negative monolith. In some embodiments, a plurality of the EOP units described herein are fluidly coupled with one another in series to form an EOP assembly. The maximum pressure output of an EOP assembly according to embodiments of the inventive concepts disclosed herein is directly proportional to the number of serially-connected EOP units in the EOP assembly. In one non-limiting embodiment, an EOP assembly of the presently disclosed inventive concepts achieved pressures exceeding 1200 bars. The pressures achievable by each monolith-filled electroosmotic pump of the presently disclosed inventive concepts is equivalent to that obtainable from several thousand open capillaries which do not contain monoliths. In one embodiment for example, one 75 um diameter positive monolith was equivalent to about 3400 700 nm diameter open capillaries while one 75 um diameter negative monolith was equivalent to about 5400 770 nm diameter open capillaries.

Further, embodiments of the inventive concepts disclosed herein are directed to methods of making EOP units and EOP assemblies by synthesizing or otherwise immobilizing porous polymer monoliths inside capillaries and methods of using the porous polymer monoliths to assemble miniaturized electroosmotic pumps. Further embodiments are directed to the characterization of the performance of the electroosmotic pumps and the use of the EOP units or EOP assemblies for HPLC separations (e.g., of intact proteins).

Some embodiments of the inventive concepts disclosed herein are directed to using EOP units and/or EOP assemblies in single-pump HPLC systems for gradient elution of proteins.

Referring now to FIGS. 1-2D, an embodiment of an EOP unit 100 according to the inventive concepts disclosed herein includes a positive pump element 102, a negative pump element 104, and electrodes 106. In an alternate embodiment, the order of the charges of the pump elements may be reversed such that the first pump element in the series is negatively charged and the second pump element in the series is positively charged.

The positive pump element 102 includes a tube 108 (e.g., a capillary) and a positive monolith 110 contained and immobilized within the tube 108. The tube 108 has a fluid inlet portion 112, a fluid outlet portion 114, an inner surface 116, a length 117, and an inner diameter 118. The tube 108 can be implemented as an enclosed conduit or capillary such as a fused silica capillary in some embodiments. The length 117 can be in a range of about 1 mm to several meters, for example, and the inner diameter 118 can vary from the μm range to the mm range (e.g., from 1 μm to several mm).

The fluid inlet portion 112 may be fluidly coupled with an inlet conduit 120 via a connector 122a, such that a fluid may be provided to the fluid inlet portion 112 via the inlet conduit 120 from any desired source. In some exemplary embodiments, the connector 122a may be implemented as a micro-tee configured to allow an electrode 106 to be electrically coupled with the fluid inlet portion 112 via the connector 122a as will be described below. A ground 124 may be electrically coupled with the connector 122a via the electrode 106, as will be described below.

The fluid inlet portion 112 may have any desired diameter and cross-section to facilitate coupling the fluid inlet portion 112 with the connector 122a, and may have a diameter equal to the inner diameter 118, less than the inner diameter 118, of greater than the inner diameter 118 of the tube 108. In some embodiments, the fluid inlet portion 112 may be implemented as a separate conduit, capillary, connector, or tube fluidly coupled with the tube 108.

The fluid outlet portion 114 can be fluidly coupled with a connector 122b. The connector 122b may be implemented similarly to the connector 122a.

The positive monolith 110 is positioned in the tube 108 between the fluid inlet portion 112 and the fluid outlet portion 114 and is immobilized therein, for example by being at least partially bonded to the inner surface 116. The positive monolith 110 is formed from a polymerized polymeric material provided with a plurality of open pores 115 having net positive surface charges. The positive monolith 110 has, in one non-limiting embodiment, a porosity of about 33% and the plurality of open pores 115 may have an average size of about 2 μm.

More generally, in various embodiments, the porosity of the positive monolith 110 may be in a range of about 1% to about 90%, e.g., in a range of about 20% to about 60%, or about 30% to about 40%, and the plurality of open pores 115 may have sizes ranging from about 1 μm to several millimeters, from about 1 μm to about 100 μm, from about 10 μm to about 100 μm, from about 10 μm to about 90 μm, from about 20 μm to about 80 μm, from about 1 μm to about 50 μm, or from about 50 μm to about 100 μm, and including any ranges and sub-ranges of all integers of μm therebetween (for example from about 1 μm to about 25 μm). In some embodiments, the open pores 115 may have sizes ranging from about 100 μm to about 1000 μm, including any ranges and sub-ranges of all integers of μm therebetween (for example from about 1 μm to about 25 μm). Further, in some embodiments, the open pores 115 may have sizes in the nanometer range, such as ranging from about 2 nm to about 10 nm, from about 2 nm to about 20 nm, from about 2 nm to about 100 nm, or from about 2 nm to about 1000 nm, and including any ranges and sub-ranges of all integers of nm therebetween (for example from about 5 nm to about 75 nm, or for example 100 nm to about 500 nm). In some embodiments, the open pores 115 may have sizes ranging between about 1 nm and about 100 μm, including all ranges and sub-ranges of all integers of nm therebetween (for example from about 5 nm to about 75 nm, and for example about 400 nm to about 500 nm).

Reagents which may be used in certain embodiments to make the monoliths disclosed herein include but are not limited to: Ethylene glycol dimethacrylate (EDMA, 98%) and butyl methacrylate (BMA); 2-Acrylamido-2-methylpropane sulfonic acid (AMPS, 99%) and [2-(Methacryloyloxy) ethyl]-trimethylammonium chloride (META, 75 wt % in water); Stearyl methacrylate, 1-propanol, and 2,2'-azobisisobutyronitrile (AIBN, 98%); Methacryloyloxypropyl-trimethoxysilane (γ-MAPS, 98%); Cyclohexanol; Acrylamide, N,N'-Methylene Bisacrylamide (bis), and N,N,N',N'-Tetramethylethylenediamine (TEMED), ammonium persulfate (APS); 1,4-Butanediol (99%). All solutions may be prepared with ultra-pure water. As noted above, polymerization of the monomer may be conducted under pressure.

The inner surface 116 of the tube 108 (e.g., a 17-30-cm length×75-μm i.d.×360-μm o.d. fused silica capillary) may be functionalized for enhancing immobilization of the positive or negative monoliths therein. For example, the inner surfaces may be vinylized with γ-MAPS or any other silane compound effective in functionalization of the inner surfaces.

In reference to FIGS. 2A-2B, in one embodiment, the positive monolith 110 was made using a positively-charged polymerization mixture comprising META, BMA, EDMA, AIBN, alcohols, and water, such as the composition: 0.72% (w/w, hereafter the % indicates w/w concentrations unless otherwise indicated) META, 23.19% BMA, 15.94% EDMA, 0.39% AIBN, 37.39% 1-propanol, 16.39% 1,4-butanediol and 6% water. The mixture was mixed ultrasonically into a homogeneous solution and purged with helium for about 5 minutes. The solution was then introduced into the vinylized tube 108.

After the tube 108 was sealed, the solution was allowed to polymerize at 60° C. in a water bath for about 20 hours, forming the porous polymeric material of the positive monolith 110 such that the porous polymeric material is provided with a plurality of open pores 115 having net positive surface charges and such that the positive monolith 110 is immobilized inside the tube 108. The positive monolith 110 was immobilized inside the tube 108 by being chemically bonded, or otherwise connected or coupled with the inner surface 116.

As a finishing step, the positive monolith 110 in the tube 108 may be washed with methanol at about 100 bars for about 12 hours (e.g., using a HPLC pump) to remove unreacted monomers and porogens. Further, the positive monolith 110 may be equilibrated with a buffer or pump solution (e.g., 3 mM sodium acetate, pH 5.0) before the EOP unit 100 is assembled. It is to be understood that embodiments of the positive monolith 110 may have any chemical composition, provided that the positive monolith 110 is constructed of a porous material provided with a plurality of open pores 115 having net positive surface charges. For example, the chemical composition (and/or polymerization pressurization conditions) of the positive monolith 110 may be adjusted so as to tune the size of the open pores 115 of the porous polymeric material or to adjust the flow rate or the pressure produced by the positive monolith 110. Further, in some embodiments counter-ions (e.g., ions carrying opposite charges to the net positive surface charges of the open pores 115) may be introduced in the positive monolith 110 body so as to make the interior of the positive monolith 110 neutral while maintaining the net positive surface charges of the open pores 115.

After the positive monolith 110 is formed and immobilized inside the tube 108, the tube 108 may be cut to produce a positive pump element 102 having any desired length 117, such as, but not limited to, ranging from about 1 mm to several meters.

As will be appreciated by persons of ordinary skill in the art, in some embodiments the inner surface 116 of the tube 108 may be provided with one or more positive monolith 110 attachment features positioned between the fluid inlet portion 112 and the fluid outlet portion 114 such as one or more flanges, grooves, ridges, or portions having diameters smaller or larger than the inner diameter 118 or combinations thereof so as to anchor or otherwise secure the positive monolith 110 inside the tube 108.

The negative pump element 104 can be implemented similarly to the positive pump element 102 and includes a tube 128 (e.g., a capillary) and a negative monolith 130 contained and immobilized within the tube 128. The tube 128 has a fluid inlet portion 132, a fluid outlet portion 134, an inner surface 136, a length 137 and an inner diameter 138. The tube 128 may be implemented similarly to the tube 108 as described above. The length 137 can be in a range of 1 mm to several meters, for example, and the inner diameter 138 can be in a range of from 1 μm to several millimeters.

The fluid inlet portion 132 can be implemented similarly to the fluid inlet portion 112 and is fluidly coupled with the fluid outlet portion 114 of the positive pump element 102 via the connector 122b. The fluid outlet portion 134 can be implemented similarly to the fluid outlet portion 114, and is fluidly coupled with an outlet conduit 140 via a connector 122c. The outlet conduit 140 may be fluidly coupled to any desired load (e.g., a pressure sensor, a capillary column, a monolith separation column, an injection valve, a gradient valve, or combinations thereof), as will be described below. The connector 122c may be electrically grounded such as via an electrode 106 electrically coupled with the connector 122c and with the ground 124.

Referring now to FIG. 2C, the negative monolith 130 can be implemented similarly to the positive monolith 110, except that the negative monolith 130 is formed from a polymerized polymeric material provided with a plurality of open pores 139 having net negative surface charges. The negative monolith 130 is positioned in the tube 128 between the fluid inlet portion 132 and the fluid outlet portion 134 and may be at least partially bonded to the inner surface 136 such that the negative monolith 130 is immobilized inside the tube 128.

In one embodiment, the negative monolith 130 is formed similarly to the positive monolith 110 as described above, except that the composition of the polymerization mixture used to form the porous polymeric material provided with the plurality of open pores 139 having net negative surface charges may instead comprise, for example, BMA, EDMA, AMPS, alcohols, and water, such as the composition: 1% AMPS, 22.91% BMA, 15.94% EDMA, 0.40% AIBN, 41.36% 1-propanol, 12.41% 1,4-butanediol and 5.98% water. After polymerization the mixture formed a porous polymeric material provided with the plurality of open pores 139 having net negative surface charges. In one embodiment, the negative monolith 130 has a porosity of about 58% and the open pores 139 have an average size of about 2 μm. More generally, the porosity of the negative monolith 130 has a porosity in the same range as the porosity of positive monolith 110 as described above, and the open pores 139 of negative monolith 130 may have average sizes in size ranges like those of the open pores 115 of positive monolith 110 described above.

Further, in some embodiments counter-ions (e.g., ions carrying opposite charges to the net negative surface charges of the open pores 139) may be introduced in the negative monolith 130 body so as to make the interior of the negative monolith 130 neutral while maintaining the net negative surface charges of the open pores 139.

In some embodiments the positive monoliths 110 may have a length of about 15 cm, and the negative monoliths 130 may have lengths of about 11.9 cm.

In one embodiment, to measure electroosmotic mobility ($\mu_{eo}$), a capillary electrophoresis system with an ultraviolet (UV) absorbance detector (214 nm) and thiourea as an unretained neutral marker were used. Briefly, a detection window was prepared at a distance of 20 cm to the injection end of a monolith prepared according to the inventive concepts disclosed herein (e.g., a positive monolith 110 and/or a negative monolith 130 having 25 cm total length) by removing part of the polyimide coating using a razor blade. The monolith column with the detection window was mounted onto the UV detector, and the monolith (e.g., 110 or 130) was equilibrated with pump solution (PS) (3 mM Sodium Acetate, pH 5.0) by pumping PS through the monolith (e.g., 110 or 130) using a HPLC pump. Then, the injection end of the monolith was inserted into an anode reservoir (for the negative monolith 130 column) or the cathode reservoir (for the positive monolith 110 column), both containing PS. After 5 mM thiourea was electrokinetically injected into the monolith column (e.g., at 5 kV for 3 s), 10 kV was applied between the reservoirs. The migration time of thiourea, t, was recorded, and $\mu_{eo}$ was computed by the velocity of thiourea divided by the field strength [$\mu_{eo}$ (cm$^2$ s$^{-1}$ V$^{-1}$)=0.05/t].

In one embodiment, to measure the overall electro osmotic flow (EOF) ($Q'_{eo}$), an open capillary (150 μm i.d.) was attached to the outlet of a pump assembly including two EOP units 100. After some PS was pumped into the open capillary, a microscope was used to monitor the movement of the meniscus. The overall EOF was estimated by the PS flow rate inside the open capillary; $Q'_{eo}$(μL s$^{-1}$)=0.0177L'/t', where L' (in mm) is the distance the meniscus had moved, and t' (in seconds) is the period of the test.

Figure 5:
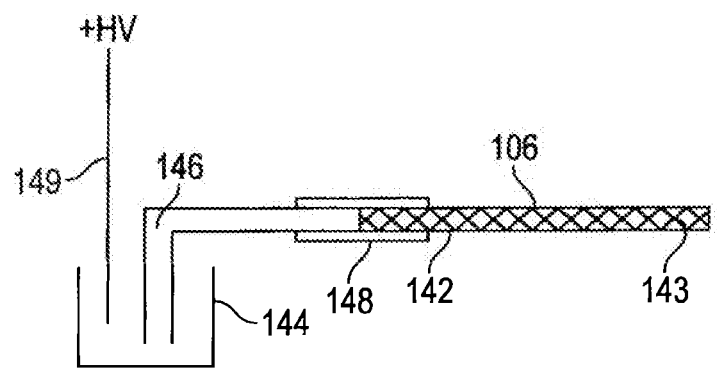
FIG. 5 is a diagram of an electrode according to the inventive concepts disclosed herein.

Referring now to FIG. 5, an electrode 106 may be implemented as a closed capillary 142 having a conductive gel 143 immobilized therein. The capillary 142 may be configured to prevent bulk flow of fluids into or out of the capillary 142, while at the same time allowing the passage of ions of either charge through the capillary 142 and/or into or out of the conductive gel 143. In some embodiments, the conductive gel 143 may be implemented as a polyacrylamide conductive gel immobilized inside the capillary 142.

In one embodiment, the electrodes 106 may be prepared as follows. A 20 cm long and 100 μm i.d. (e.g., about 360 μm o.d.) capillary 142 may be cut, and its inner wall may be cleaned by flushing the capillary 142 with 1.0 M NaOH for 45 min, DI water for 15 min, and acetonitrile for about 15 min. After the capillary 142 is dried with N$_2$, the inner wall can be reacted with a solution containing 30% (v/v) γ-MAPS (or other functionalizing silane composition) in acetone at 50° C. for 14 h. The capillary 142 can be flushed with acetonitrile and dried with N$_2$. A degassed solution containing, for example, 15% T (% T stands for the total weight concentration of acrylamide and bis in the solution), 2% C (% C represents bis concentration relative to acrylamide), 0.2% (v/v) TEMED, and 0.1% APS can be pressurized into the capillary 142 and allowed to remain inside the capillary 142 at 0° C. overnight and then 4° C. for another 24 h. The polymer structure of the electrodes 106*a-c* is presented in FIG. 2D. A 50 mM sodium tetraborate solution can be electrophoretically driven through the polyacrylamide gel inside the capillary 142 until a stable current is obtained. The capillary 142 can be cut into pieces, (for example about 2 cm in length), and each piece may serve as an electrode 106.

As shown in FIG. 5, the electrode 106 may be electrically and/or fluidly coupled with a buffer reservoir 144 via a conduit 146 coupled with the capillary via a connector 148. The conduit 146 may allow buffer solution from the buffer reservoir 144 to come into contact with the capillary 142. Any desired electrical current or electrical voltage source may be electrically coupled with the buffer reservoir 144 via a metal electrode 149, such that high voltage can be provided to the electrode 106. The electrode 106 may function as a polyacrylamide grounding interface which blocks bulk flow but permits the passage of ions of either charge type.

The electrodes 106 can function similarly to a salt bridge, but the conducting gel 143 is immobilized inside the capillary 142. The buffer reservoir 144 and the conduit 146 contain a solution with sufficient pH buffer capacity and ionic strength. When a potential is applied to the metal electrode 149, the potential will go all the way to the capillary 142 tip, owing to the conductive nature of the buffer solution in the conduit 146 and the gel 143 in the capillary 142. Because the gel 143 is immobilized inside the capillary 142, the pump solution cannot leak out through the electrode 106. The capillary 142 functions as a virtual electrode. As an electric current passes through the capillary 142 electrolysis occurs, but only at the metal electrode 149 in the buffer reservoir 144. The electrolysis-generated H$^+$ or OH$^-$ is neutralized by the buffer solution. Electrolysis does not occur at the capillary 142 tip; therefore, pH change and bubble formation are suppressed at the capillary 142 tip. Hence, this setup may be referred to as a bubbleless or bubble-free electrode 106.

An electrode 106*a* is electrically coupled to the fluid outlet portion 114 and the fluid inlet portion 132 via the connector 122*b* so as to apply an electrical voltage across the positive and negative monoliths 110 and 130 in a way to cause a fluid to flow through the positive and negative pump elements 102 and 104 in a direction from the inlet conduit 120 toward the outlet conduit 140.

Electrodes 106*b* and 106*c* are coupled with the ground 124 in any desired manner. For example, the ground 124 may be implemented as a grounded buffer reservoir 144 in some exemplary embodiments of the inventive concepts disclosed herein, and may include a conduit 146 and a connector 148.

The fluid inlet portion 112 and/or the inlet conduit 120 of the EOP unit 100 and the electrodes 106*a*-106*c* may be fluidly coupled with appropriate reservoirs (not shown) containing PS. The high voltage (HV) can be applied to the appropriate reservoirs in any desired manner, such as via platinum electrodes.

An external high voltage (HV) can be applied across the positive monolith 110 and the negative monolith 130 via the electrode 106*a*. Because electroosmotic flow (EOF) goes from Ground to +HV in the positive monolith 110 and from +HV to ground in the negative monolith 130, pump solution can move from the fluid inlet portion 112 of the positive monolith 110 to the fluid outlet portion 134 of the negative monolith 130 smoothly. One characteristic feature of the EOP unit 100 is that: if the positive monolith 110 generates a pressure of $P_1$ (i.e., the pump solution in the fluid outlet portion 114 is under a pressure of $P_1$) and the negative monolith 130 generates a pressure of $P_2$, the pressure at the outlet conduit 140 is theoretically equal to $P_1+P_2$.

Electrical voltage applied across the positive monolith 110 and the negative monolith 130 by the electrode 106*a* causes a fluid to flow through the positive pump element 102 at a first pressure ($P_1$) and through the negative pump element 104 at a second pressure ($P_2$) so that the fluid flows out of the fluid outlet portion 134 and/or the outlet conduit 140 at a third pressure equivalent to about $P_1+P_2$.

Table 1 lists experimentally determined effective open pore diameters (e.g., of open pores 115 and 139) and porosities for positive monoliths 110 and negative monoliths 130 according to the inventive concepts disclosed herein. In one non-limiting embodiment of the positive monolith 110, the effective diameter of open pore 115 is about 700 nm, and porosity is about 33%. In one non-limiting embodiment, the open pores 139 of negative monolith 130 may have a larger diameter (e.g., about 770 nm) and higher porosity (about 58%).

TABLE 1

Effective open pore diameters and porosities of positive and negative monoliths according to certain embodiments of the inventive concepts disclosed herein.

| | $\mu_{eo}^2$ | $Q_{eo}^3$ | $\Delta P_{max}^4$ | $d^5$ | m | Porosity |
|---|---|---|---|---|---|---|
| Positive monolith[1] | 3.98 ± 0.05[6] | 115 ± 4 | 130 ± 1.9 | 0.70 ± 0.01 | 3370 ± 254 | 33% ± 1.4% |
| Negative monolith | 2.85 ± 0.04 | 145 ± 4 | 76 ± 4.9 | 0.77 ± 0.02 | 5440 ± 424 | 58% ± 2.3% |

[1]Both positive and negative monoliths were prepared inside 75 μm i.d. capillaries and had a length of 15 cm. The external voltage applied across the monoliths was 5 kV;
[2]the numbers have a unit of $10^{-4}$ $cm^2$ $V^{-1}$ $s^{-1}$;
[3]the numbers have a unit of nL $min^{-1}$;
[4]the numbers have a unit of bar;
[5]the numbers have a unit of μm; and
[6]all the numbers after "±" are standard deviations.

The largest open pores (115 and/or 139) in both monoliths 110 and 130, respectively, may have comparable sizes (e.g., about 1 to 2 μm). The high porosities of the negative monoliths 130 are thought to be caused by the greater granules which compose the negative monoliths 130. In order for an EOP unit 100 according to the inventive concepts disclosed herein to produce a high pumping pressure and a large flow rate, the positive and negative monoliths 110 and 130 can be optimized to have high porosities and open pores 115 and 139 with small diameters.

To further optimize performance, flow rates in the positive and negative monoliths 110 and 130, respectively, can be configured to be approximately or substantially identical. For example, when the electroosmotic mobilities (flow rates) in two adjacent positive and negative monoliths (e.g., 110 and 130, respectively) differ, the difference can be compensated by reducing the length of (and therefore increasing the electric field strength on) the monolith having the lower electroosmotic mobility. In one embodiment of the EOP unit 100 wherein the positive pump element 102 has a first electroosmotic mobility (first flow rate) and the negative pump element 104 has a second electroosmotic mobility (second flow rate), the lesser mobility (lesser flow rate) is divided by the greater mobility (greater flow rate) to obtain a fractional value which is then multiplied by the length of the monolith having the greater mobility to determine an approximate length for the monolith having the lesser mobility. For example, in one embodiment, the ratio of the first flow rate in the positive monolith 110 to the second flow rate in the negative monolith 130 was experimentally determined to be about 115/145, giving a fractional value of about 0.793. The length of the positive monolith 110 was shortened to about 11.9 cm while the length of the negative monolith 130 was about 15 cm (e.g., 15 cm×0.793=11.9 cm).

Even if the flow rates in two monoliths 110 and 130 differ, the EOP unit 100 may still work properly as long as both monoliths are pushing the pump solution forward (the flow rate and/or pressure from a downstream monolith is lower than the flow rate and/or pressure from an upstream monolith). If any of the monoliths are pulling the pump solution forward (the flow rate and/or pressure of the downstream monolith is greater than the flow rate and/or pressure of the upstream monolith), a negative pressure may have been created before the monoliths, which could lead to bubble formation and electrical disconnection inside the EOP unit 100.

Because both the inlet conduit 120 and outlet conduit 140 of the EOP unit 100 are electrically grounded, multiple EOP units 100 may be connected in series, such that the outlet conduit 140 of an EOP unit 100*a* is connected to the inlet conduit 120 of a second EOP unit 100*b*, and so on as desired.

In EOP 100 of the present disclosure, as noted above, where the positive pump element 102 generates a pressure $P_1$ and the negative pump element 104 generates a pressure $P_2$, the combined pressure P at the outlet conduit 140 of the EOP 100 will be ($P_1+P_2$). Further, the overall pressure output of an EOP assembly including multiple EOP units 100 is equal to $n(P_1+P_2)$, where n is the number of EOP units 100 connected in series. That is, any pressure can be theoretically achieved by incorporating an appropriate number of EOP units 100 into an EOP assembly according to the inventive concepts disclosed herein.

Figure 6:
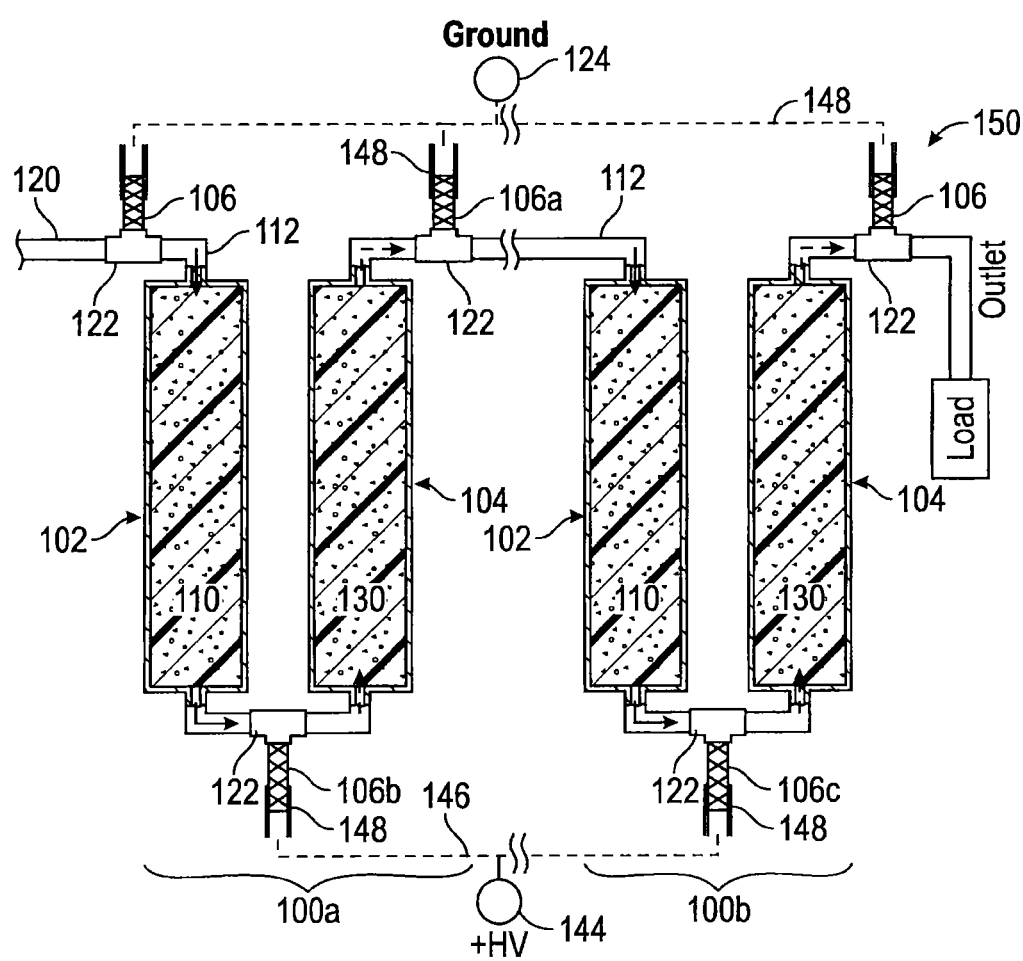
FIG. 6 is a diagram of an electroosmotic pump assembly according to the inventive concepts disclosed herein.

Referring now to FIG. 6, an embodiment of an EOP assembly 150 includes two EOP units 100*a* and 100*b* coupled with one another in series. It is to be understood that an EOP assembly 150 according to the inventive concepts disclosed herein may include any desired number of EOP units 100, such as two or more, three, four, five, or a plurality of EOP units 100.

The EOP units 100*a* and 100*b* may be coupled with one another in series such that the outlet portion 134 and/or the outlet conduit 140 of the EOP unit 100*a* is fluidly coupled with the inlet conduit 120 and/or the fluid inlet portion 112 of the EOP unit 100*b*, for example via a connector 122. The connector 122 coupling the EOP unit 100*a* and the EOP unit 100*b* may be electrically coupled with the ground 124 via an electrode 106*a* coupled with the connector 122, so that the outlet portion 134 and/or the outlet conduit 140 of the EOP unit 100*a* and the inlet conduit 120 and/or the fluid inlet portion 112 of the EOP unit 100*b* are electrically grounded.

Further, an electrode 106*b* can be electrically coupled with the EOP unit 100*a*, and an electrode 106*c* can be electrically coupled with the EOP unit 100*b*, as described above. In some embodiments, the electrodes 106*b*-106*c* may be electrically coupled to a single electrical voltage source, while in some embodiments two or more electrodes 106 may be coupled to separate electrical voltage sources.

Figure 3:
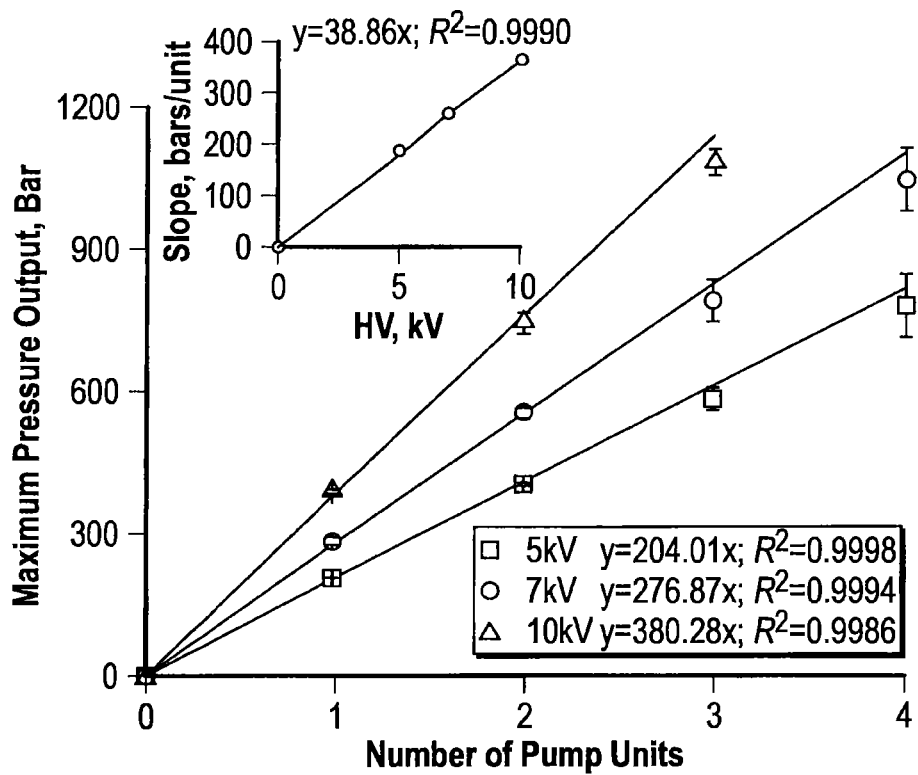
FIG. 3 is a graph showing the relationship between pressure output and number of electroosmotic pump units according to the inventive concepts disclosed herein.

It has been experimentally determined that a linear relationship exists between the maximum pressure output of an EOP assembly 150 and the number of serially-connected EOP units 100 which comprise the EOP assembly 150. FIG. 3 shows pressure output of an EOP assembly 150 as a function of the number of serially connected EOP units 100. Both the positive monolith 110 and negative monolith 130 were prepared inside 75-μm-i.d. capillaries. The positive monolith 110 had a length of 11.9 cm, while the negative monolith 130 had a length of 15 cm. The pumping solution was 3 mM sodium acetate (pH 5.0).

In theory, any pressure may be achieved by incorporating a desired number of EOP units 100 into an EOP assembly 150. In reality, an upper pressure limit may be practically constrained by the connectors 122 used to join the plurality of EOP units 100 and the electrodes 106 to one another. In one embodiment the EOP assembly 150 enables a pumping pressure in a range of at least 100 bars, to at least 200 bars, to at least 300 bars, to at least 400 bars, to at least 500 bars, to at least 600 bars, to at least 700 bars, to at least 800 bars, to at least 900 bars, to at least 1000 bars, to at least 1100 bars, to at least 1200 bars, to at least 1300 bars, to at least 1400 bars, to at least 1500 bars. In one embodiment using selected microtees from Valco Instruments (Houston, Tex., USA) as connectors 122, a pressure of about 1208 bars was achieved.

The maximum pressure output of the EOP assembly 150 also increases linearly with the voltage applied on the EOP units 100 (see inset of FIG. 3). Accordingly, two options exist to raise the pressure output of the EOP assembly 150, (1) incorporating more EOP units 100 connected in series to the EOP assembly 150 and (2) elevating the electric field across the positive monoliths 110 and the negative monoliths 130. The former option is optimal if high voltages are undesirable. A large number of EOP units 100 can be constructed on a LOC device conveniently according to some embodiments to the inventive concepts disclosed herein.

Figure 4:
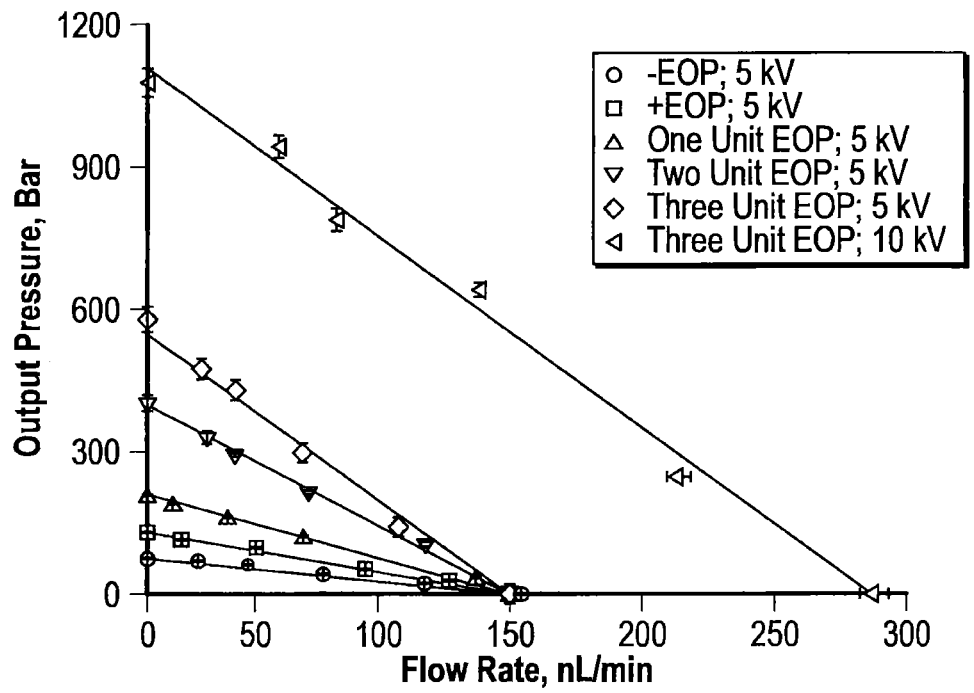
FIG. 4 is a graph showing the relationship between output pressure and pump rate of electroosmotic pump units according to certain embodiments of the inventive concepts disclosed herein.

In one embodiment, when the EOP assembly 150 was practically utilized, the actual pump pressure ($\Delta P_{actual}$) was smaller than the projected $\Delta P_{max}$, because the actual pump rate ($Q_{actual}$) will not be zero. FIG. 3 presents the relationship between actual pump pressure ($\Delta P_{actual}$) and actual pump rate ($Q_{actual}$). As indicated by FIG. 4 and as represented by Equation 1, the actual pressure output of an EOP assembly 150 decreases linearly with the increasing pump rate. In general, $$\Delta P_{actual} = \left(1 - \frac{Q_{actual}}{Q'_{eo}}\right) \Delta P_{max} = \Delta P_{max} - \frac{\Delta P_{max}}{Q'_{eo}} \times Q_{actual} \quad \text{(Equation 1)}$$

EOP assemblies 150 can generate both high pumping pressure and relatively high flow rates, compared to existing pump assemblies using open capillaries as pumping elements. The reason is that the positive and negative monoliths 110 and 130 include porous materials, and by tuning the experimental parameters the pore sizes of the positive and negative monoliths 110 and 130 can be controlled to be small to enhance the pumping pressure and the porosities of the monoliths 110 and 130 can be controlled to be high to boost the flow rate. The effective pore diameter of a polymer monolith such as the positive monolith 110 and/or the negative monolith 130 can be estimated from the maximum pressure output of the respective positive monolith 110 or negative monolith 130 according to the Hagen-Poiseuille's equation, $$\Delta P_{max} = \left(\frac{128 \eta L}{m \pi d^4}\right)(m Q_{eo}) = \left(\frac{32 \eta V}{d^2}\right) \mu_{eo} \quad \text{(Equation 2)}$$

where $\Delta_{max}$ represent the maximum output pressure (a pressure produced as the EOP unit 100 is completely blocked such that the flow rate is zero), η is the viscosity of the pump solution, L is the length of the respective monolith e.g., 110 or 130), d is the effective pore diameter, m is the number of equivalent pores, $Q_{eo}$ is the electroosmotic flow in a single pore, $\mu_{eo}$ is the electroosmotic mobility, and V is the voltage applied across the monolith (e.g., 110 or 130). Since $\Delta P_{max}$ and $\mu_{eo}$ can be experimentally measured, and η and V are known experimental parameters, d can be calculated using Equation 2. Once d is known, m can be calculated from the overall EOF ($Q'_{eo}$). The porosity of the monolith (e.g., 110 or 130) can be computed by:

$$\phi = \frac{md^2}{d'^2}, \quad \text{(Equation 3)}$$

where d' is the inner diameter of the tube 108 housing the respective monolith 110 or 130.

In the embodiment shown in FIG. 4, linear fitting results using equation 1 for curves from the bottom to the top are: $\Delta P_{max}$=80.4 bars, $Q'_{eo}$=145 nL/min, and $R^2$=0.996; $\Delta P_{max}$=135 bars, $Q'_{eo}$=145 nL/min, and $R^2$=0.993; $\Delta P_{max}$ 210 bars, $Q'_{eo}$=145 nL/min, and $R^2$=0.979; $\Delta P_{max}$=397 bars, $Q'_{eo}$=145 nL/min, and $R^2$=0.998; $\Delta P_{max}$=551 bars, $Q'_{eo}$=143 nL/min, and $R^2$=0.995; $\Delta P_{max}$=1108 bars, $Q'_{eo}$=287 nL/min, and $R^2$=0.995. The error bars were obtained from 3-5 repetitive measurements. Other conditions were the same as stated with reference to FIG. 3 above.

Figure 7:
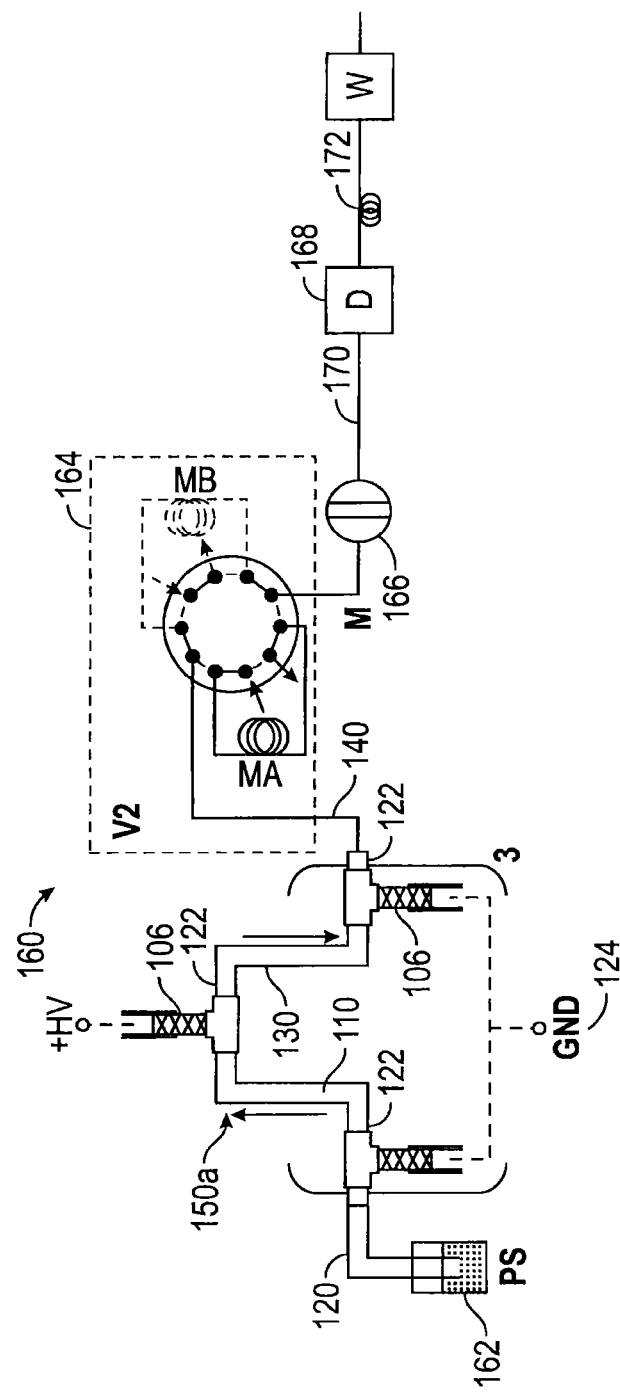
FIG. 7 is a diagram of a high-performance liquid chromatographic system including an electroosmotic pump assembly according to certain embodiments of the inventive concepts disclosed herein.

Referring now to FIG. 7, a HPLC system 160 according to the inventive concepts disclosed herein may include a pump solution reservoir 162, an EOP assembly 150a, a gradient valve 164, an injection valve 166, a linear UVIS detector 168, a monolith separation column 170, and a restriction column 172.

The pump solution reservoir 162 may be implemented as any desired vessel or container and may include a pump solution (PS) of 3 mM sodium acetate (pH 5.0).

The EOP assembly 150a may include three EOP units 100 (with only one shown for clarity). An electrode 106 may be used to apply a voltage (V) of about 10 kV to the EOP assembly 150a.

The gradient valve 164 may be implemented as a ten-port valve (Valco Instruments) with an 11-cm-long and 75 μm i.d. capillary loop MA and a 25-cm-long and 320 μm i.d. capillary loop MB. The loop MA may include 0.1% Trifluoroacetic acid in 30% (v/v) acetonitrile aqueous solution. The loop MB may include 0.1% Trifluoroacetic acid in 64% (v/v) acetonitrile aqueous solution.

The injection valve 166 may be implemented as a 4 nL injection valve. A connector or tubing M may be used to fluidly couple the gradient valve 164 and the injection valve 166, and may be implemented as a 10-cm-long and 75 μm i.d. capillary.

The separation column 170 may be implemented as a 20-cm-long and 75 μm i.d. acrylate monolith column and may be constructed by using a similar method to that for positive monolith 110 preparation. After a 32-cm-long and 75-μm-i.d. (360-μm-o.d.) fused silica capillary is cleaned and vinylized, a solution containing 17.8% stearyl methacrylate, 11.9% EDMA, 0.30% AIBN, 42% 1-propanol, and 28% 1,4-butanediol may be introduced into the capillary to fill a length of up to about 22 cm, leaving about 10 cm of the capillary unfiled. The capillary ends may be sealed with septa, and the entire capillary may be placed in a water bath at 60° C. for 20 h for monolith formation. A 1-2 mm detection window may be created on the empty-capillary end but close to the monolith by removing the polyimide coating with a razor blade. The column can be cut to 30 cm with an effective length of 20 cm.

The linear UVIS detector 168 can be implemented as a Linear UVIS 200 absorbance detector (210 nm). The restriction column 172 can be implemented as a 40-cm-long and 75 µm i.d. acrylate monolith column constructed similarly to the separation column 170.

The HPLC system 160 may be used for protein separation with gradient elution as follows. When the gradient valve 164 is set at a "MA" position (all ports are connected via the dashed lines), mobile phase A (MA, a weaker eluent) is pumped to condition the separation column 170. At this time, mobile phase B (MB) is loaded into MB-loop, and a sample is loaded into the injection valve 166. When the gradient valve 164 is switched to "MB" position (all ports are connected via the solid lines), the injection valve 166 is also switched to inject the sample to the separation column 170. As MA in tubing M and MB in the MB-loop are driven forward, they are mixed, forming a gradient eluent for analyte separation, while MA in the MA-loop is replenished. The gradient profile can be controlled by changing the compositions and/or concentrations of MA and MB, and the geometry and dimensions of M. In general, the MA-loop and MB-loop are sufficiently long so that all analytes can be eluted out and the separation column can be reconditioned thoroughly. The restriction coil 174 may function to prevent bubble formation in the HPLC system 160, and may be fluidly coupled with any suitable waste container.

Microcolumn liquid chromatography has been recently introduced. Microcolumn separation efficiencies per unit time increase with the decreasing sizes of packing particles. However, as particle sizes scale down and column diameters shrink, higher pumping pressures (more than 6000 psi) and lower flow rates (less than 1 µL/min) are required. Microcolumn systems are often called nano-flow HPLC (nano-HPLC or nano-LC) and are particularly advantageous (with respect to conventional LC) when used in conjunction with a mass spectrometer (MS), because all of the effluent can be effectively transferred into the MS. Ideally, nano-flow HPLC separations should be driven by reliable micropumps capable of generating low flow rates, such as EOP units 100 and/or EOP assemblies 150 according to the inventive concepts disclosed herein.

It has been found that organic solvents may degrade the performance of EOP units 100 and/or EOP assemblies 150 over time. The degradation may be due to the incompatibility between the organic solvent and polyacrylamide gel inside the electrode 106. This presents an issue if the EOP unit 100 or the EOP assembly 150 is used to drive nano-flow HPLC separation for proteins/peptides separations, because high concentrations of organic solvents such as acetonitrile are often used to elute these analytes. It would be advantageous to configure a nano-flow HPLC system to incorporate EOP units 100 or EOP assemblies 150 so that the EOP units 100 or the EOP assemblies 150 do not come into contact with the organic solvent during operation.

Figure 8:
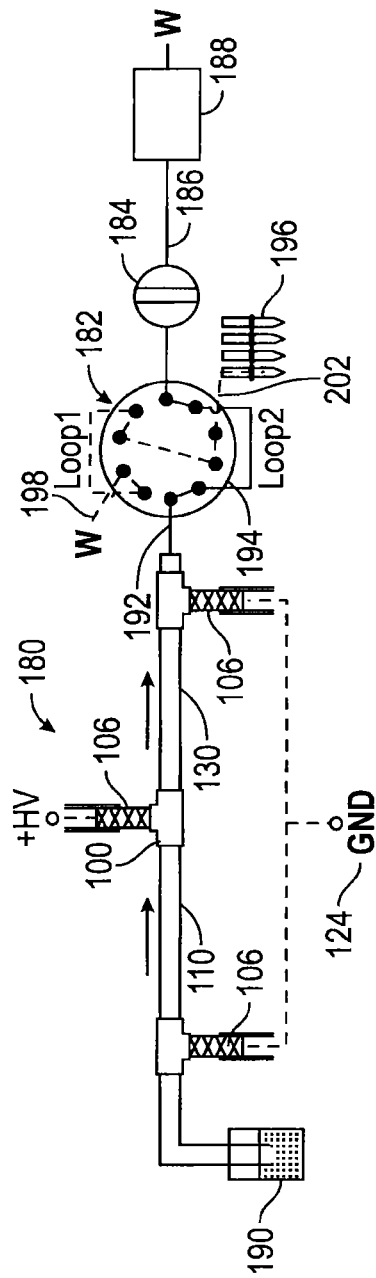
FIG. 8 is a diagram of a nano-flow HPLC system according to the inventive concepts disclosed herein.
Figure 8A:
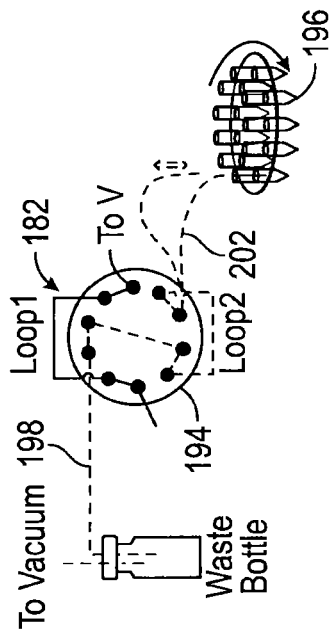
FIG. 8A is a diagram of a nanoflow gradient generator of the nano-flow HPLC system of FIG. 8.

Referring now to FIGS. 8 and 8A, in some embodiments, in order to enhance the durability of the EOP unit 100 used to drive nano-flow HPLC separations for proteins/peptides using high concentrations of an organic solvent (e.g., acetonitrile) to elute the analytes, a nano-flow HPLC system 180 may include an EOP unit 100, a nano-flow gradient generator 182, a nanoliter injection valve 184, a packed capillary column 186, and a detector 188.

The nano-flow HPLC system 180 is configured so that the EOP unit 100 pumps an aqueous solution and does not pump the organic solvent. Both the EOP unit 100 and the nano-flow gradient generator 182 may be implemented as capillary-based components, to yield a total capillary-based nano-flow HPLC system 180 capable of performing gradient elutions in some embodiments.

The EOP unit 100 is implemented as described above and may be fluidly coupled with a pump solution reservoir 190 which contains pump solution or buffer solution as described above. It is to be understood that an EOP assembly 150 having any desired number of EOP units 100 may be implemented with a nano-flow HPLC system 180 according to the inventive concepts disclosed herein. The EOP unit 100 is fluidly connected to the gradient generator 182 via a capillary 192 which may be implemented as a 250 µm i.d.×365 µm o.d.×20 cm length capillary.

The nanoflow gradient generator 182 includes a valve 194 and a mini auto-sampler 196. The nanoflow gradient generator 182 is similar to Deguchi et al.'s design, but the normal gradient delivery system is replaced with the mini auto-sampler 196. The nanoflow gradient generator 182 has no flow splitters and generates only a few µL of waste per run. The EOP unit 100 pumps an aqueous solution (e.g., from the reservoir 190) so that the flow of the EOP unit 100 is stable.

The detailed construction of the gradient generator 182 is depicted in FIG. 8A and includes a primarily 10-port valve 194, a mini auto-sampler 196, and a vacuum line 198. The gradient generator 182 is connected to the nanoliter injection valve 184 through a capillary 200, and then to the packed capillary column 186.

The injection valve 184 may be a 4 nL (or 60 nL) injection valve, and may be implemented similarly to the injection valve 166 as described above. The packed capillary column 186 is coupled to the injection valve 184 and is implemented similarly to the separation column 170 described above.

The detector 188 may be implemented as a UV absorbance detector and may be set at 210 nm for absorbance detection. In some embodiments the absorbance signal from the detector 188 can be acquired using a NI multifunctional card DAQ Card (6062E, National Instruments, Austin, Tex.), and the data can be processed with a LabView program. Alternatively, the detector 188 may be implemented as an ESI-MS (LCQ Decca XP plus mass spectrometer. When the detector 188 is implemented as a mass spectrometer, the packed capillary column 186 can be configured to butt-to-butt connect to a metal-film-coated nanospray-ionization (NSI) emitter (a 5 cm long, 360 µm o.d., and 20 µm i.d. fused silica capillary with a 5 µm i.d. spray tip) with a zero-dead-volume PTFE coupler. The voltage can be applied directly to the metal film on the spray tip. Xcalibur can be used for instrumental control and data processing. Nano ESI-MS can be performed at a full scan mode with an m/z range of 300-1800.

In operation, as vacuum is applied to the vacuum line 198, the weakest eluent is first aspirated into Loop 1 on the valve 194. After the injection valve 184 is activated to inject a sample to the packed capillary column 186, the valve 194 can be switched to the position as shown in FIG. 8A, the weakest eluent can be delivered via the capillary 200 and the injection valve 184 to the packed capillary column 186. At the same time, the eluent-inlet capillary 202 of the auto sampler 196 is transferred to the next and slightly stronger eluent to load this eluent to Loop 2. After a preset period of time depending on the separation needed, the valve 194 can be switched back (to the position as shown in FIG. 8) to deliver the eluent in Loop 2 to the packed capillary column 186, while Loop 1 is loaded with the next stronger eluent. As a train of eluent segments with increasing elution power is delivered to packed capillary column 186 consecutively, analytes are eluted out sequentially. The gradient profile can be adjusted by changing the compositions of the eluents in the vials on the auto-sampler 196, and/or the lengths of the eluent segments Loop 1 and Loop 2.

In some embodiments, an EOP unit 100 according to the inventive concepts disclosed herein may be incorporated into integrated bare narrow capillary-hydrodynamic chromatographic systems (BaNC-HDC) for gel-free rapid, high-resolution, and repeatable separations of a wide size range of DNA at the single-molecule level in free-solution.

Referring now to FIGS. 9A-9E, an embodiment of a BaNC-HDC system 210 according to the inventive concepts disclosed herein includes an EOP unit 100, a chip injector 212, a bare narrow open capillary column 214, and a laser-induced fluorescence (LIF) detector 216.

The chip injector 212 includes a glass chip 218 and a valve 220. The glass chip 218 includes microfabricated cross-channels 222 formed therein. The valve 220 may be implemented as an off-chip six-port valve (e.g., Model 7725i, IDEX Corporation, Lake Forest, Ill.). The cross-channels 222 are round and have a diameter of ~170 µm. In some embodiments, the cross-channels 222 can be produced using standard photolithographic technologies as will be described in detail with reference to FIG. 10 below. Cross grooves may be created on two glass wafers. For example, where a cross pattern on a photomask has a line-width of 10 µm, the grooves may be virtually semi-circular after they are isotropicly etched to a depth of 85 µm. Round cross-channels 222 can be formed as the two etched wafers are face-to-face aligned and bonded.

A separation capillary 224 (70 cm long, 150 µm o.d., and 2 µm i.d.) is connected to the glass chip 218 and to the cross channels 222 at position 1, and a sample capillary 226, a pump capillary 228, and waste capillary 230 (e.g., all 15 cm long, 150 µm o.d., and 15 µm i.d. capillaries) were connected to the glass chip 218 at positions 2, 3, and 4, respectively. All capillaries 224, 226, 228, and 230 can be secured to the glass chip 218 using epoxy adhesive. The sample capillary 226 and the waste capillary 230 are also coupled to the valve 220. The separation capillary 224 has a length of between 40 cm and 70 cm, an o.d. of 150 µm, and an i.d. of 2 µm.

Referring now to FIGS. 9B-9E, sample injection may be carried out by the BaNC-HDC system 210 as follows. The arrows indicate the flow directions and the solid dots on the valve 220 indicate blocked ports and the blank dots indicate open ports throughout FIGS. 9A-9E.

The valve 220 can be switched between an "open" position (where the sample capillary 226 is connected to position 2 on the glass chip 218 and to a sample source S and the waste capillary 230 is connected to position 4 of the glass chip 218 and to a waste receptacle W) and a "closed" position (where the sample capillary 226 and the waste capillary 230 are connected to blocked ports).

Figure 9A:
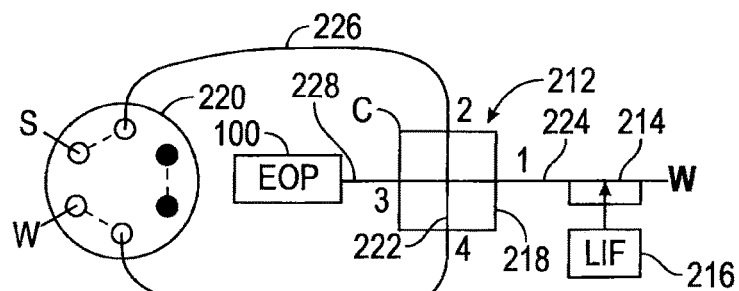
FIGS. 9A-9E are diagrams of an integrated base narrow capillary hydrodynamic chromatographic system according to certain embodiments of the inventive concepts disclosed herein.
Figure 9B:
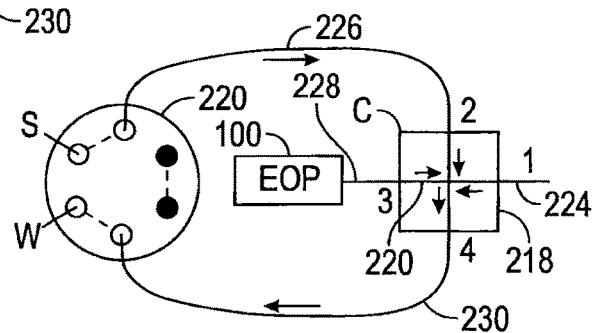

In a step 1 shown in FIG. 9B, the sample (S) is aspirated into the cross channels 222 of the chip injector 212 by applying vacuum to the waste receptacle W for about 20 seconds, while the valve 220 is set at the "open" position and the EOP unit 100 is powered off (e.g., no electrical voltage is applied across the monoliths 110 and 130).

Figure 9C:
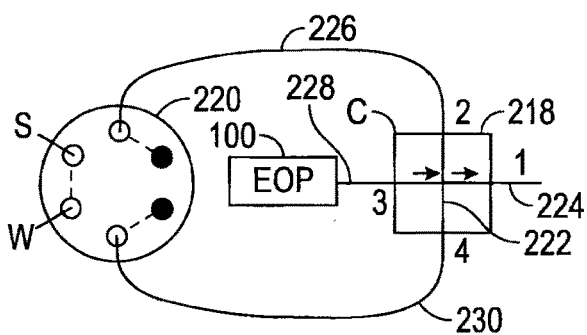

In a step 2 shown in FIG. 9C the valve 220 is switched to the "closed" position and the EOP unit 100 is powered on. A portion of the sample in the cross channels 222 is driven into the separation capillary 224. The quantity of the injected sample can be controlled by adjusting the flow rate of the EOP unit 100 and the injection time.

Figure 9D:
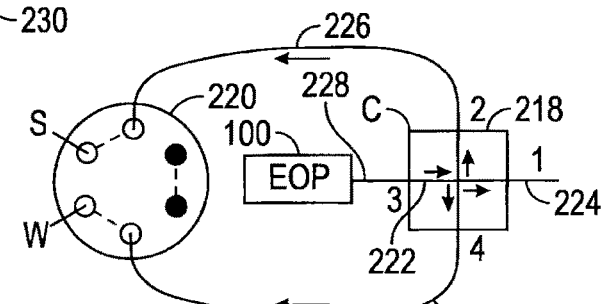

In a step 3 shown in FIG. 9D the valve 220 is switched back to the "open" position as the EOP unit 100 is kept powered on so that any sample remaining in the cross channels 222 is flushed to the waste receptacle W via the waste capillary 230.

Figure 9E:
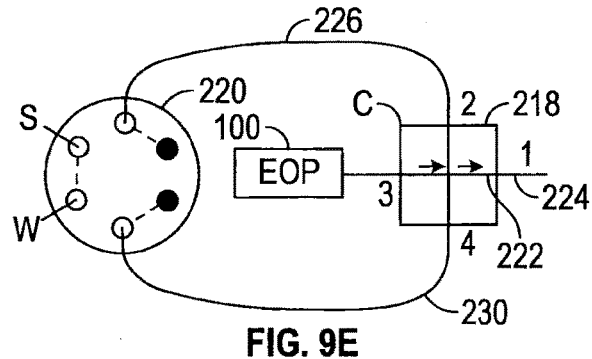

In a step 4 shown in FIG. 9E, while the EOP unit 100 is kept powered on, the valve 220 is switched to the "closed" position. The separation is carried out via the separation capillary 224, and the laser-induced fluorescence (LIF) detector 216. With this operation procedure, better than 5% relative standard deviations (peak areas) have been consistently obtained and injected sample volumes of as low as a few pL can be accurately controlled and gel-free DNA separations can be carried out with minimal waste and high-precision with a BaNC-HDC system 210 according to the inventive concepts disclosed herein.

Further, the minimal waste generation and low operation costs make BaNC-HDC systems according to the inventive concepts disclosed herein an attractive alternative to gel-based techniques, particularly to PFGE for separating large DNA fragments. Integrating an EOP unit with microfabricated chip-injectors and BaNC-HDC according to the inventive concepts disclosed herein allows injecting samples at low-picoliter (pL) volumes reliably, eluting analytes at hundreds of pL/min flow-rates or lower repeatably, and resolving a wide size range of DNA fragments rapidly in free solution at the single-molecule level.

In some embodiments, EOP units and/or EOP assemblies may be microfabricated into polymer monoliths, such as by using standard photolithographic technologies with Cr/Au or amorphous silicon as etching masks, to produce capillaries into a microchip with low dead-volumes. Thermal diffusion bonding may be used to micro fabricate EOPs according to the inventive concepts disclosed herein, although protocols with chemically activated bonding and adhesive annealing are available.

Figure 10:
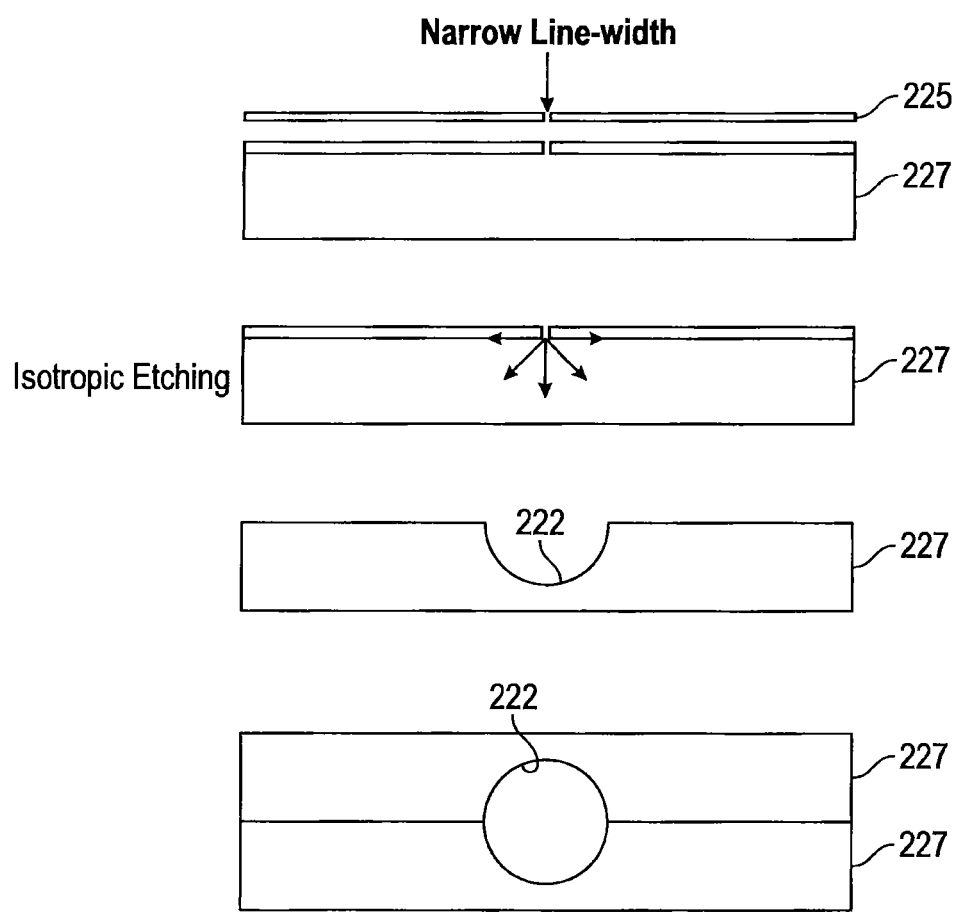
FIG. 10 is a diagram of a method of incorporating channels into chips according to the inventive concepts disclosed herein.

Referring now to FIG. 10, wet-etch using hydrofluoric acid may be used to fabricate chips and/or the channels 222 shown FIGS. 9A-9E, according to some embodiments of the inventive concepts disclosed herein. A characteristic of this etching process is its isotropic nature. If a photomask 225 of narrow line-width is used, isotropic etching results in a semicircular channel. For example, if a line width on the photomask 225 is 5 µm, a 100-µm-deep channel 222 will have a virtually semicircle profile with a long radius of 102.5 µm and a short radius of 100 µm. A very "round" channel 222 is formed after two etched wafers 227 are face-to-face aligned/bonded. Round channels 222 can be used to connect a chip to capillaries and bubbleless electrodes as will be described below.

Figure 11:
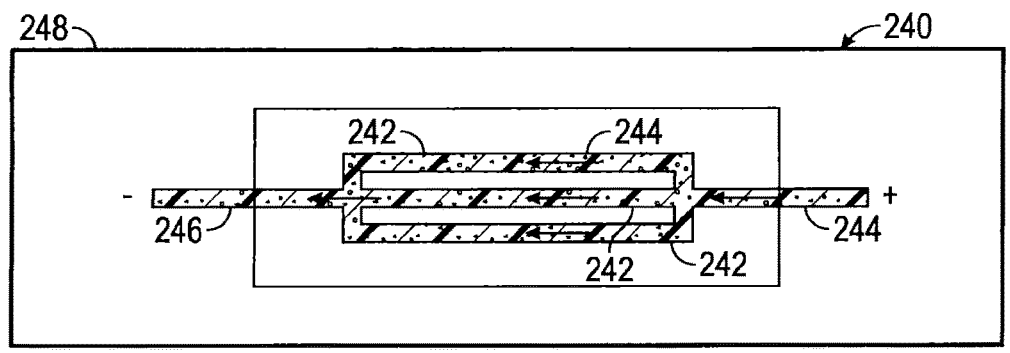
FIG. 11 is a diagram of an embodiment of a chip EOP element according to the inventive concepts disclosed herein.

Referring now to FIG. 11, a schematic design of a chip EOP element 240 according to the inventive concepts disclosed herein is shown. Multiple monolith channels 242, a common inlet channel 244, and a common outlet channel 246 may be fabricated on a chip 248. The inlet channel 244 and the outlet channel 246 can be round for incorporating connecting capillaries as will be described below. The monolith channels 242 may be round or may have any desired cross-section other than round, but each monolith channel 242 may have a smaller cross-section area than that of the common inlet channel 244 and/or the outlet channel 246. It is to be understood that increasing the number of monolith channels 242 increases the flow rate through the chip EOP element 240, but does note maximum pump pressure produced by the chip EOP element 240 for a given voltage.

Figure 12:
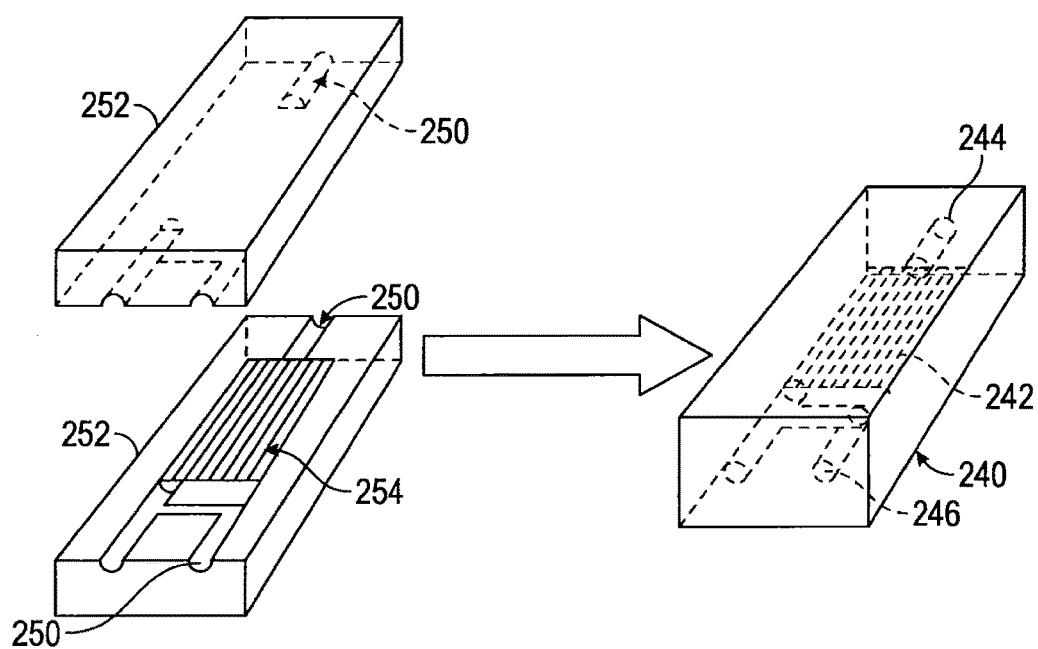
FIG. 12 is a diagram of a method of making the chip EOP element of FIG. 11 according to embodiments of the inventive concepts disclosed herein.

Referring now to FIG. 12, shown is a schematic fabrication process for the chip EOP element 240 of FIG. 11. Three photo masks may be used to make the chip EOP element 240. Broadly, semi-circular inlet/outlet grooves 250 are fabricated on two wafers 252 using a first photomask. Monolith channels 254 are fabricated on one or both of the wafers 252. When the two wafers 252 are face-to-face aligned and bonded (e.g., via thermal bonding), the circular inlet channels 244 and outlet channels 246 are produced. After the chip EOP element 240 is made and one or more connecting capillaries are incorporated, both positive and negative monoliths may be formed inside the monolith channels 242 (including any connecting capillaries). The monolith formulations and polymerization conditions may be optimized so that monolith pore sizes and porosities are tuned.

Figure 13:
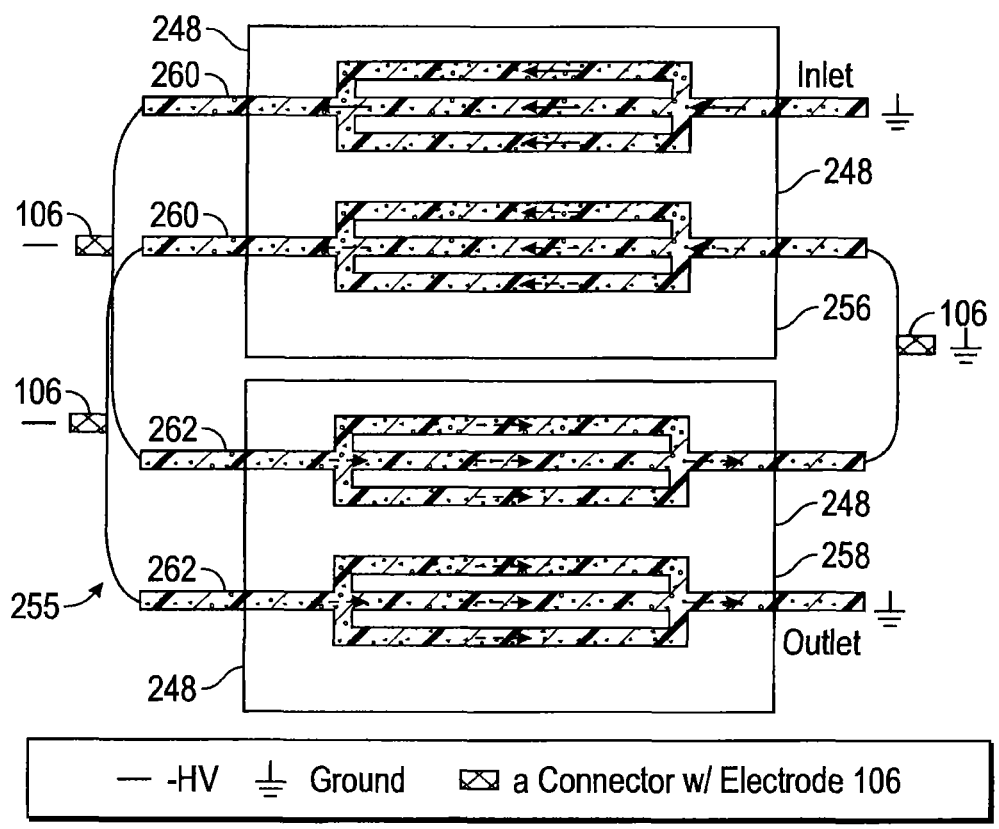
FIG. 13 is a diagram of an embodiment of a chip EOP unit according to the inventive concepts disclosed herein.

FIG. 13 shows an embodiment of a chip EOP assembly 255. A number of positive monolith chip EOP elements 256 are fabricated on a chip 248, and the same number of negative monolith chip EOP elements 258 are fabricated on another chip 248 as described above. The outlet 260 of a positive monolith chip EOP element 256, the inlet 262 of a negative monolith chip EOP element 258, and an electrode 106 can be joined such as via a connector similar to the connector 122 described above.

As positive monolith chip EOP elements 256 and negative monolith chip EOP elements 258 are prepared as described above, it is unlikely that positive monolith chip EOP elements 256 and negative monolith chip EOP elements 258 will produce the same electroosmotic flow (EOF) rates. In case the differences are too great (e.g., differ by more than about 50%), channels (e.g., monolith channels 254) for individual chip EOP elements 256 and/or 258 can be made with different channel depths and/or lengths to equalize the flow rate capabilities.

Figure 14B:
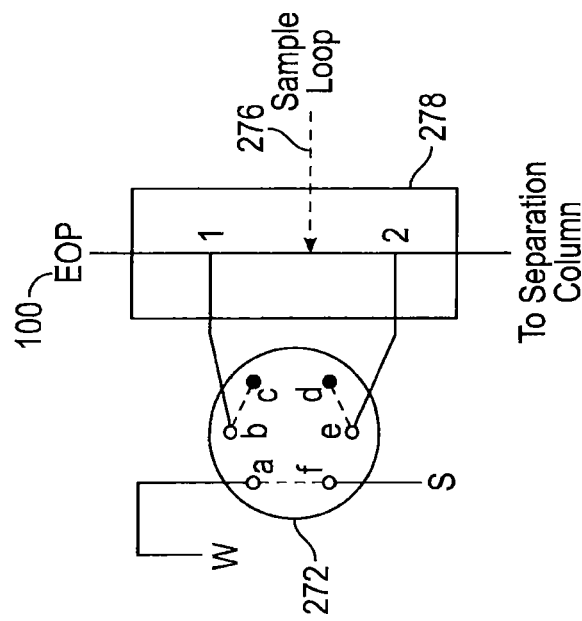
FIGS. 14A-14B are diagrams of an embodiment of an on-chip sample injection system which may be implemented with nano-flow HPLC systems according to the inventive concepts disclosed herein.
Figure 14A:
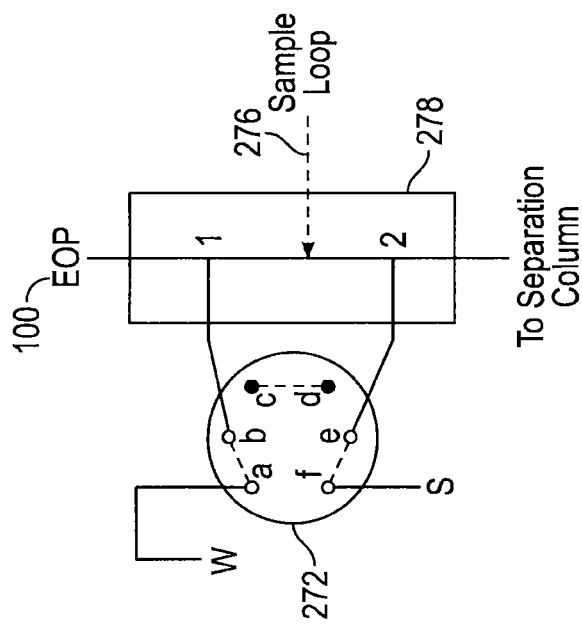

Referring now to FIGS. 14A-14B, in some embodiments an on-chip sample injection system 270 according to the inventive concept disclosed herein may include a six-port valve 272 attached directly to a chip injector 274. When the valve 272 is in a first position as shown in FIG. 14A and the EOP 100 is powered off, a vacuum is applied to the waste (W) to aspirate the sample (S) into the sample loop 276 between positions 1 and 2 on a chip 278. After switching the valve 272 to a second position as shown in FIG. 14B (the solid dots indicate these ports are blocked), turning on the EOP 100 drives the sample solution in the sample loop 276 to a separation column. Since the sample loop 276 is microfabricated on a chip 278, the volume of the sample loop 276 can be controlled from pL to µL (with folded-channel). Bleed off from the horizontal connecting capillaries at points 1 and 2 of the sample loop can be minimized by narrowing the aperture at the entrance points.

Figure 15A:
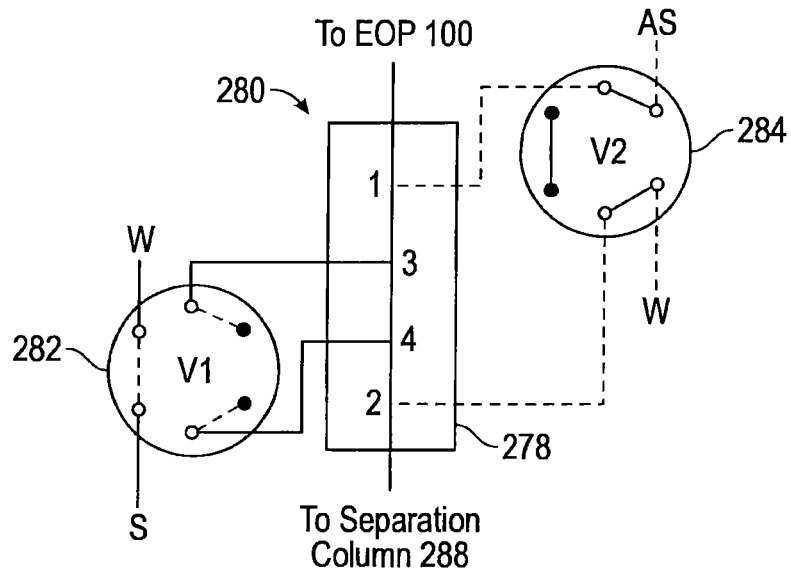
FIGS. 15A-15C are diagrams of an embodiment of an on-chip sample injection scheme which may be implemented with nano-flow HPLC systems according to the inventive concepts disclosed herein.
Figure 15B:
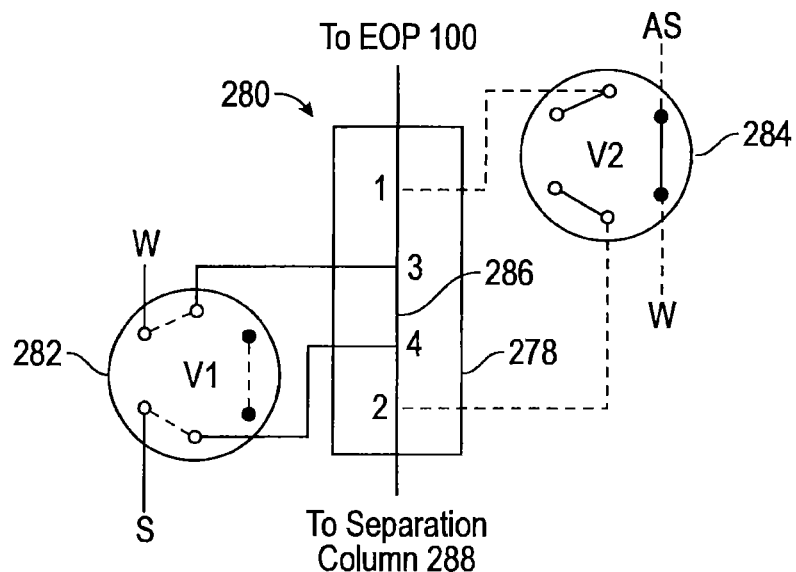
Figure 15C:
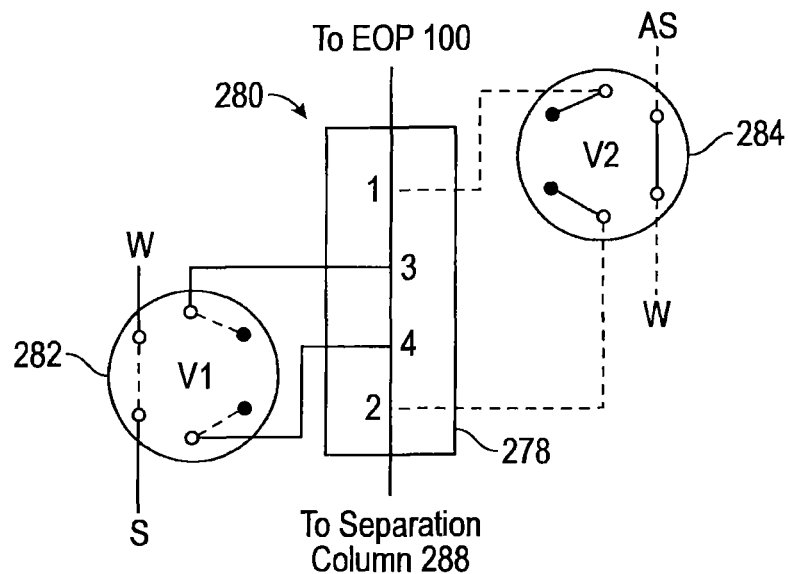

Referring now to FIGS. 15A-15C, in some cases where samples need to be concentrated, a pre-concentration column is often used for this purpose in conventional HPLC. An on-chip sample concentration system 280 according to the inventive concepts disclosed herein may include two 6-port valves 282 and 284 and a chip 278 used to concentrate a sample. The on-chip sample concentration system 280 may bracket a sample between two longer plugs of a very weak eluent. The leading plug may wash the head of the column and the trailing plug may allow the sample to be fully absorbed at the head of the column without being dispersed down the column by the eluent.

With the valve 282 being blocked (FIG. 15A), an auxiliary solution (AS) with weak eluting power can be loaded between positions 1 and 4. Then, the valve 284 is blocked and the valve 282 is open so that a sample solution (S) is loaded into the vertical conduit or sample loop 286 between positions 3 and 4 (FIG. 15B). Finally, the valves 282 and 284 are blocked, and EOP 100 drives a train of solutions (AS) (between positions 4 and 2), S (between positions 3 and 4), AS (between positions 1 and 3), and eluent to the separation column 288 for concentration and separation (FIG. 15C).

Figure 16:
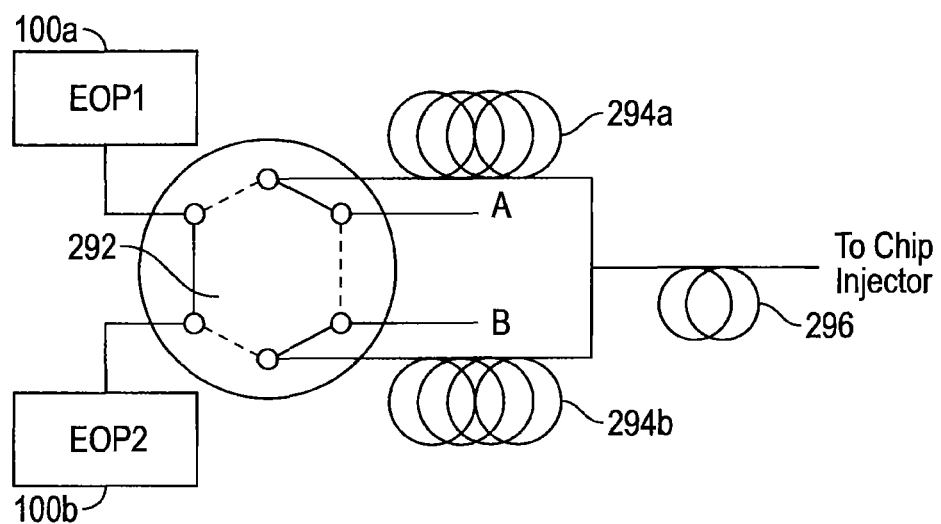
FIG. 16 is an example of an on-chip gradient generation system according to certain embodiments of the inventive concepts disclosed herein.

Referring now to FIG. 16, in some embodiments a gradient generation system 290 according to the inventive concepts disclosed herein includes a valve 292, EOP units 100a and 100b, a solvent coil 294a, a solvent coil 294b, and a mixing coil 296. The mixing coil 296 can be fluidly coupled with the on-chip sample injection system 270 and/or with the on-chip sample concentration system 280 described above.

When the valve 292 is in the solid-line connected position, the EOP unit 100a and the EOP unit 100b drive eluent A in the solvent coil 294a and eluent B in the solvent coil 294b to the mixing coil 296. A gradient elution is produced as the voltages on the EOP unit 100a and the EOP unit 100b are tuned. As the valve 292 is switched to the dashed-line connected position, eluents A and B can be replenished in solvent coils 294a and 294b.

Figure 17A:
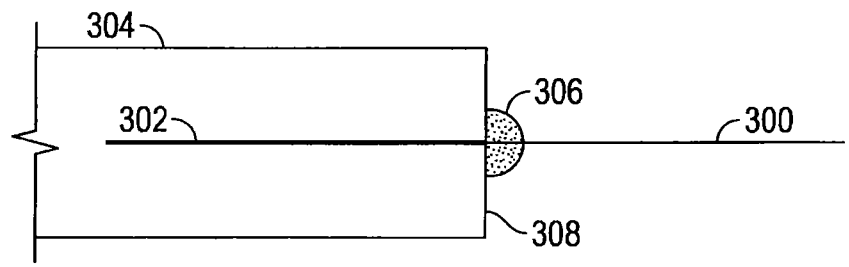
FIGS. 17A-17C are diagrams of embodiments of a method of forming capillary-to-chip connections according to the inventive concepts disclosed herein.
Figure 17B:
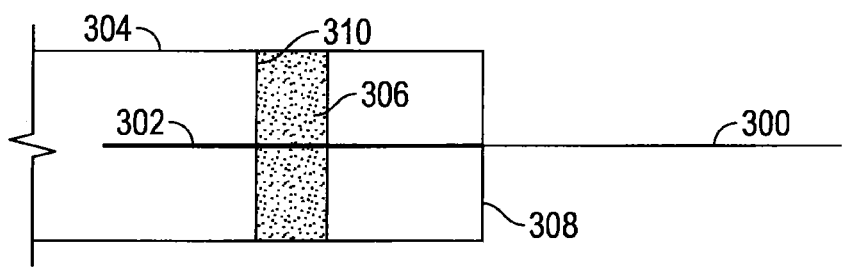
Figure 17C:
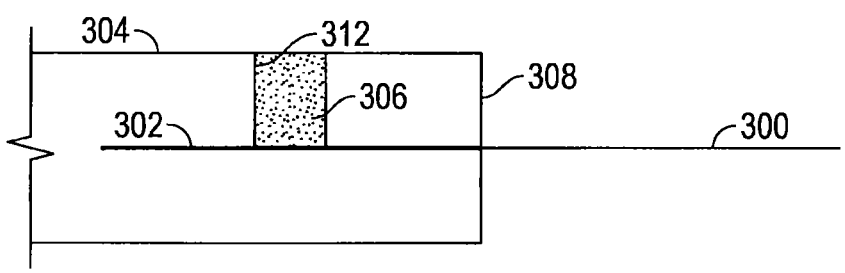

FIGS. 17A-17C illustrate embodiments of a method of connecting capillaries to chips according to the inventive concepts disclosed herein. As shown in FIG. 17A, traditionally, a capillary 300 was first inserted into a channel 302 formed in a chip 304 and glue 306 was applied to an edge 308 of the chip 304. The capillary 300 was typically pulled back and pushed forward a few times so that at least a portion of the glue 306 enters and seals any gaps between the capillary and the channel 302.

In some embodiments, after a channel 302 (e.g., cross-channels 222) is formed in a chip 304 as described above, a hole or opening 310 can be drilled or otherwise formed across the channel 302 as shown in FIG. 17B. The capillary 300 can be inserted into the channel 302 from the edge 308 of the chip 304, and glue 306 can be applied to the opening 310. The capillary 300 can be moved back and forth a few times to allow some of the glue 306 to enter and seal any gaps between the capillary 300 and the channel 302. The shearing forces are expected to increase considerably with this connection approach relative to the above connection approach.

In some embodiments, an access opening 312 may be formed across a groove before the wafers are bonded as described above as shown in FIG. 17C. After the chip 304 is made, the capillary 300 can be inserted into the channel 302 and secured in position by applying glue 306 to the access opening 312. The capillary 300 may be moved back and forth a few times (e.g., while being twisted) so that some of the glue 306 enters and seals any gaps between the capillary 300 and the channel 302.

Example

This example describes a non-limiting embodiment of a high-pressure EOP constructed in accordance with the presently disclosed inventive concepts. In this embodiment, the monolith material has been improved by applying a pressure to the monomer solution during polymerization. A binary (i.e., double monolith) EOP gradient generator ("bi-Egg") is assembled, and the relationship between the gradient profile and voltage applied on the EOP is examined. The feasibility of the binary EOP gradient generator for generating smooth and reproducible nanoflow gradient is demonstrated. After integrating the gradient generator into a miniaturized HPLC, the HPLC is used for separating peptide mixtures from trypsin-digested proteins. The performance of the miniaturized HPLC assembly constructed herein is compared to that of a commercially-available HPLC (an Agilent 1200 HPLC). The two devices exhibit comparable efficiencies, resolutions, and peak capacities.

Experimental

Reagents and Materials

Methacryloyloxypropyl-trimethoxysilane (γ-MAPS, 98%) was purchased from Acros (Fairlawn, N.J.). Ethylene glycol dimethacrylate (EDMA, 98%) and butyl methacrylate (BMA) were purchased from Alfa Aesar (Ward Hill, Mass.). 2-Acrylamido-2-methyl-propane sulfonic acid (AMPS, 99%) was obtained from Sigma-Aldrich (St. Louise, Mo.). 1-Propanol, and 2,2'-azobisiso-butyronitrile (AIBN, 98%) were obtained from Aldrich (Steinheim, Germany). 1,4-Butanediol (99%) was obtained from Emerald BioSystems (Bainbridge Island, Wash.). Acrylamide, N,N'-methylene bisacrylamide (Bis), N,N,N',N'-tetramethyl-ethylenediamine (TEMED), and ammonium persulfate (APS) were obtained from Bio-Rad Laboratories (Hercules, Calif.). Cytochrome C and bovine serum albumin (BSA) were obtained from Sigma (St. Louis, Mo.). Sequencing grade modified trypsin was purchased from Promega (Madision, Wis.). LC-MS grade acetonitrile (ACN) was purchased from Fisher Scientific (Fair Lawn, N.J.). Fused silica capillaries were purchased from Polymicro Technologies Inc. (Phoenix, Ariz.). All other reagents used in this study were analytical grade or above and used as received. All solutions were prepared with ultra-pure water purified by a NANO pure infinity ultrapure water system (Barnstead, Newton, Wash.).

Preparation and Characterization of EOP Monolith

The inner wall of a capillary was first vinylized with γ-MAPS using the following procedure. A 1-m-long by 100-μm-i.d. (360-μm-o.d.) capillary was flushed with acetone for 10 min, and 1.0 M NaOH for 10 min. Then, the capillary was filled with 1.0 M NaOH, sealed with rubber septa, and put in an oven at 100° C. for 2 h. After the capillary was taken out of the oven, it was washed with water, 0.1 M HCl, water, and acetone; each for 20 min. The capillary was then dried with $N_2$ for 1 h at 60 psi, and the inner wall was reacted with a solution containing 30% (v/v) γ-MAPS in acetone at 50° C. for 14 h. After the capillary was flushed with acetone and dried with $N_2$, the capillary was ready for the monolith preparation. To produce a monolith inside the above capillary, a solution containing 5 mg AMPS (1%, the % indicates w/w concentrations unless otherwise indicated), 115 mg BMA (23%), 80 mg EDMA (16%), 210 mg 1-propanol (42%), 60 mg 1,4-butanediol (12%), and 30 mg water (6%) was prepared, and 2 mg AIBN was added into the solution as an initiator. The solution was mixed ultrasonically into a homogeneous solution and purged with helium for 10 min. This solution was then introduced into a 20-cm-long vinylized capillary. The two ends of the capillary were connected to a microtee (Valco Instruments, Houston, Tex., USA), and the third port of the microtee was connected to an HPLC pump. A pressure of ~1000 psi was applied to the polymerizing solution while the reaction was allowed to proceed at 60° C. in a water bath for 20 h, forming a negative monolith immobilized inside the capillary. The monolith was then washed with acetonitrile under ~1500 psi for 12 h to remove the unreacted monomers and porogens, and equilibrated with a pump solution (PS, 3.0 mM sodium acetate, pH 5.0) for 30 min. The ends of the capillary were cut off to obtain a desired length for experimentation.

Scanning electron micrographs were acquired to examine the column morphology and pore structure using a Zeiss NEON high resolution scanning electron microscope after coated with approximately 4 nm iridium (Ir) using an Emitech K575D sputter coater.

The maximum flow rate ($Q_{max}$, the flow rates at a zero backpressure) and maximum pumping pressure ($P_{max}$, the backpressure at a zero flow rate) of an EOP at a given high voltage were measured. Briefly, an empty capillary with 200 μm i.d. was connected by a union to the outlet of an EOP. As the EOP was turned on, the meniscus of PS inside the empty capillary was monitored and measured using a microscope. The maximum flow rate of the EOP was calculated by $$Q_{max} = \frac{314\,L}{t}\,\text{(nL/min)},$$

where L (cm) is the length of the meniscus moved within a time period of t (min). A flow-through pressure sensor (model 602192-2, Senso-Metrics Inc., Simi Valley, Calif.) was used for measuring the maximum pumping pressure. The sensor channel was first flushed with methanol at a flow rate of 1 mL/min for 10 min to remove possible trapped air bubbles. After the sensor was rinsed with PS, the outlet of the pump assembly was connected to the sensor inlet while the sensor outlet was blocked using a stainless steel plug from IDEX (Lake Forest, Ill., USA). The HV was then applied to the pump assembly, and the pressure number on the sensor indicator increased gradually. A $P_{max}$ value was recorded as the pressure became stabilized.

Preparation of Polyacrylamide-Based Bubbleless Electrode

Polyacrylamide-based bubbleless electrode was prepared substantially as described above. A degassed solution containing 10% T (% T is the total weight concentration of acrylamide and Bis in the solution), 2% C (% C represents Bis concentration relative to acrylamide), 0.2% v/v TEMED, and 0.1% APS was pressurized into a 20-cm-long vinylized capillary. The polymerization reaction was allowed to proceed inside the capillary at 0° C. overnight under a pressure of ~300 psi, and then at 4° C. for another 24 h. Other pressures and duration times may be used. After both ends of the capillary were trimmed off by 1 cm, the capillary was cut into 2-cm-long segments and stored in a pump solution; each segment served as a polyacrylamide-based bubbleless electrode. In certain embodiments, both electrodes may be negatively-charged, both may be positively-charged, or one may be negatively-charged and one may be positively-charged.

Integration of Bi-Egg into Miniaturized HPLC

Figure 18:
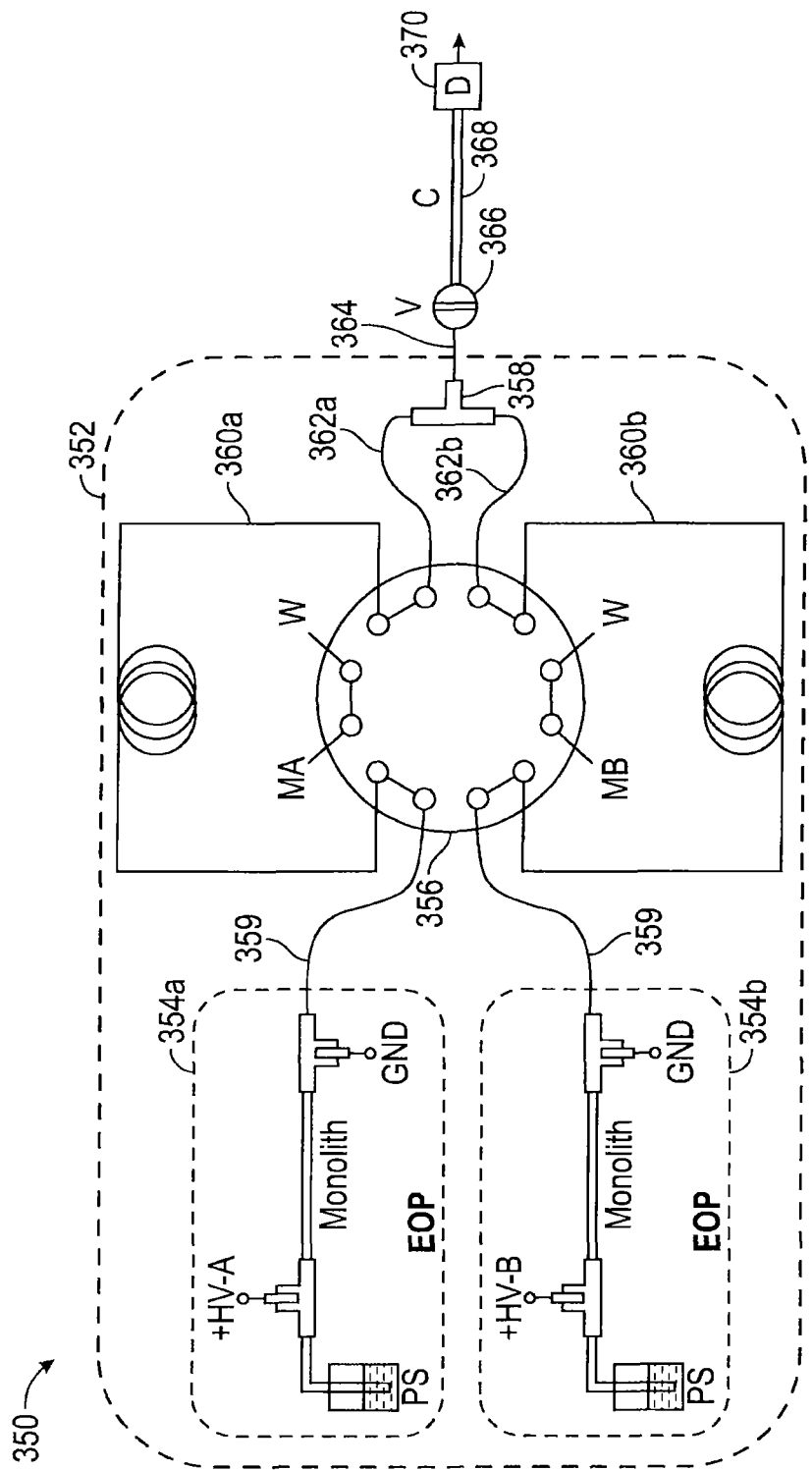
FIG. 18 is a schematic configuration of binary-EOP gradient generator (bi-Egg) and miniaturized high performance liquid chromatographic system constructed according to the inventive concepts disclosed herein.
Figure 19A:
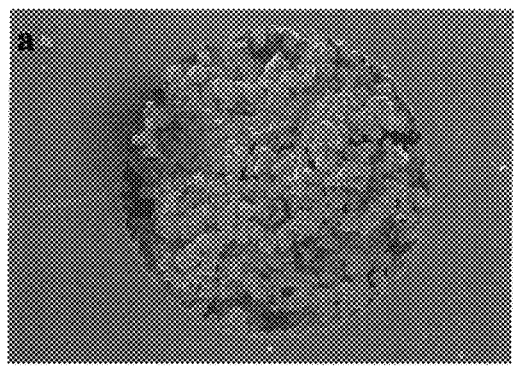
FIGS. 19A-19D show Scanning Electron Micrograph (SEM) images of typical negative monoliths prepared by conventional and pressure-assisted preparation method.
Figure 19B:
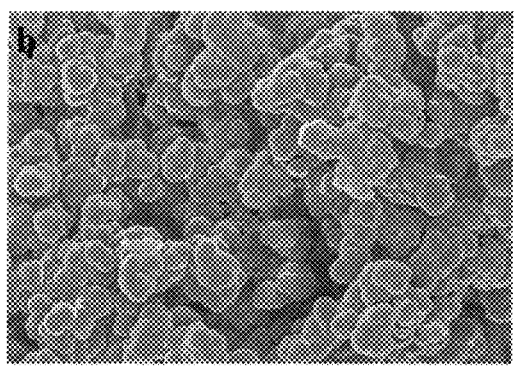
Figure 19C:
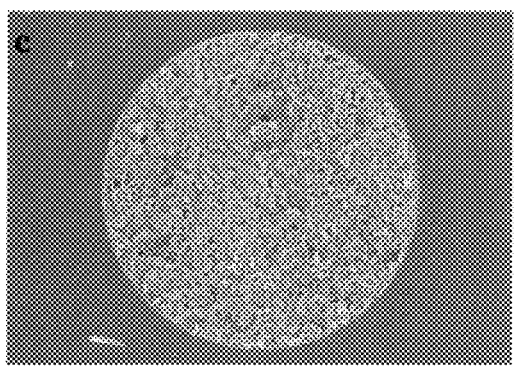
Figure 19D:
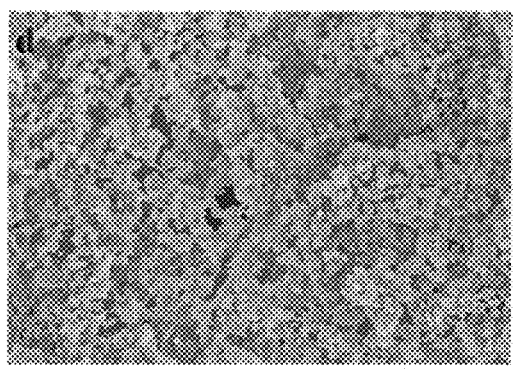
Figure 20A:
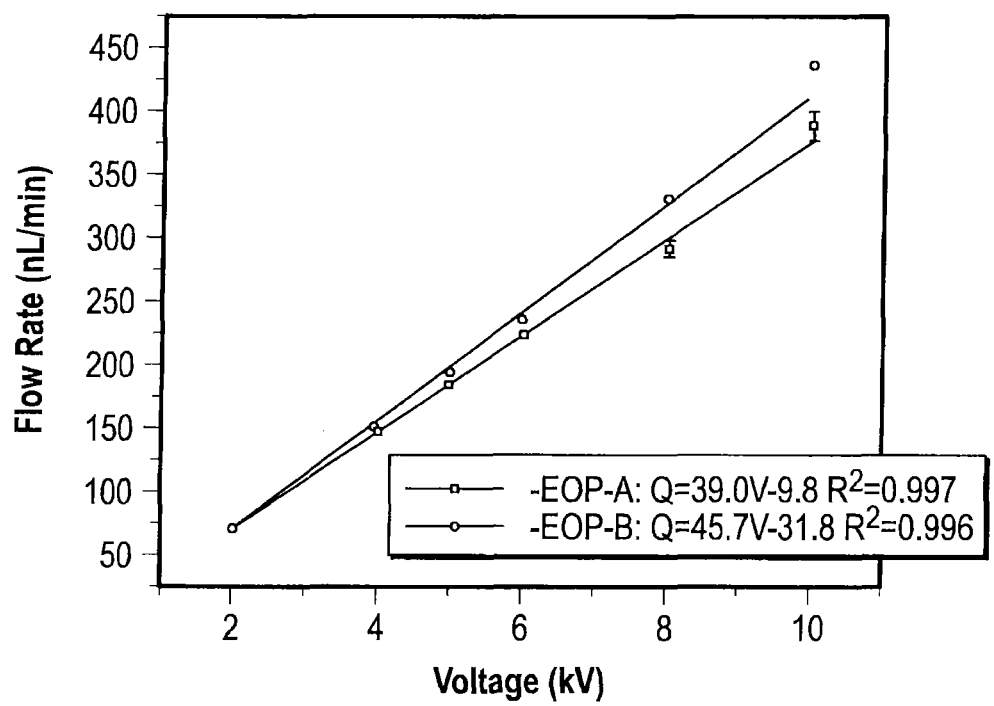
FIGS. 20A-20C depict graphical characterizations of the bi-Egg components represented in the embodiment of FIG. 18.
Figure 20B:
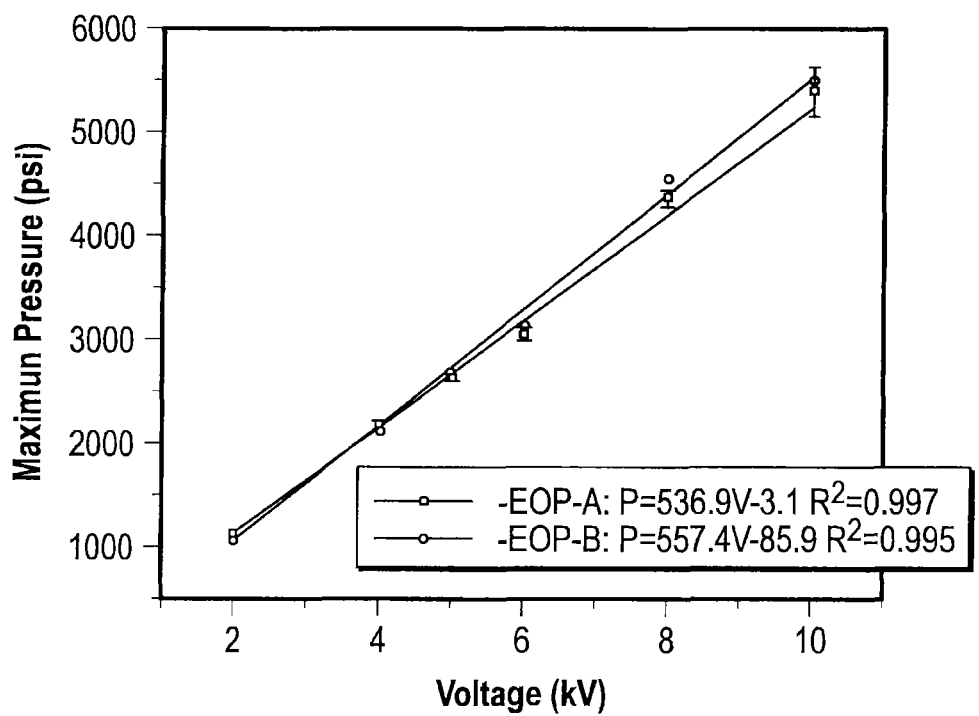
Figure 20C:
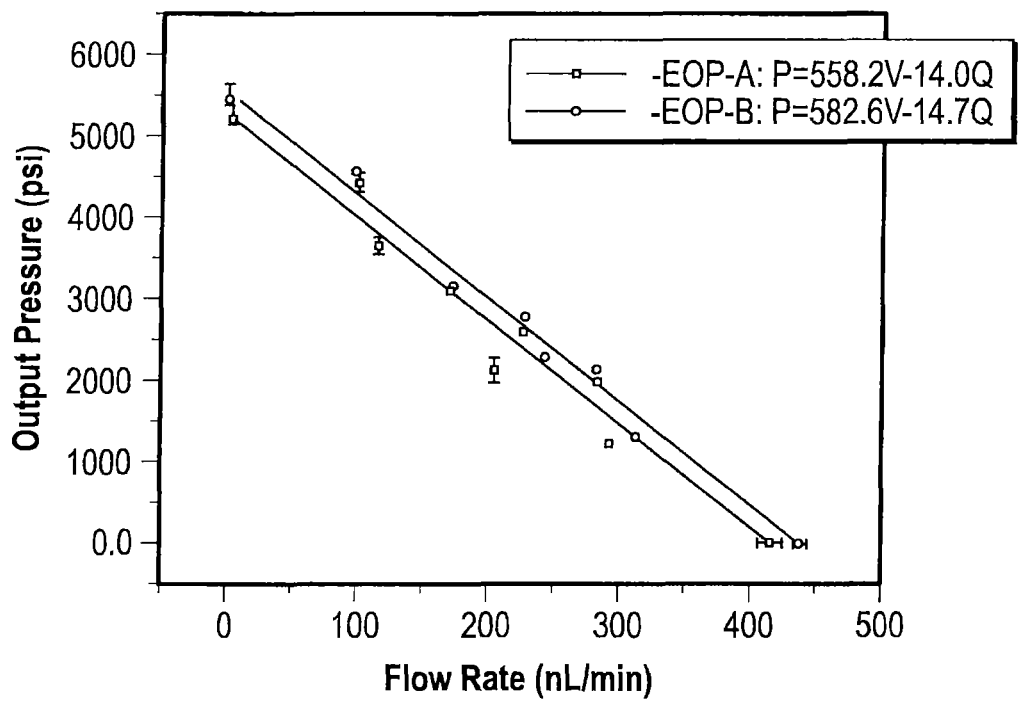

FIG. 18 is a schematic diagram of a miniaturized HPLC 350 with an integrated bi-Egg unit 352 constructed in accordance with the presently disclosed inventive concepts. The bi-Egg unit 352 was constructed of two high-pressure EOPs 354a and 354b, one twelve-port valve 356 (VICI Valco Instruments, Houston, Tex.), and a microtee 358. The EOP outlets were connected to the twelve-port valve 356 via a 150-μm-i.d.×365-μm-o.d.×20-cm-long capillaries 359. Two capillary loops 360a and 360b, (each has dimensions of 200-μm-i.d.×365-μm-o.d.×100-cm-length) were incorporated into the valve 356 for housing different eluents; the eluents could be easily replenished as the valve 356 was set at the other position (with respect to the position shown in FIG. 18). The two outlets from the valve 356 were connected via two 75-μm-i.d.×15-cm-long capillaries 362a and 362b to the microtee 358, and another 75-μm-i.d.×10-cm-long capillary 364 was used to connect the microtee 358 to a nanoliter injector 366 (VICI Valco Instruments), followed by a packed capillary column 368 (Waters, Atlantis™ dC18 NanoEase Column, 75-μm-i.d.×100-mm-length). A Linear UVIS 200 absorbance detector 370 (Spectra-Physics, Fremont, Calif.) was set at 210 nm for absorbance monitoring. The absorbance signal was acquired using a NI multifunctional card DAQ Card (6062E, National Instruments, Austin, Tex.), and the data was processed.

The bi-Egg unit 352 was controlled by a gradient high voltage power supply (not shown), which was constructed using a programmable linear D.C. power supply (GWIN-STEK™ GPD-2303S, Global Test Supply, Wilmington, N.C.) and two high voltage power supplies (0-30 kV, EMCO Model 4300, Sutter Creek, Calif.). The voltages applied to the EOPs 354a and 354b were controlled through a USB port of a computer using a LabView (National Instruments) program.

Protein Digestion

Tryptic digests of cytochrome C and BSA were used to evaluate the performance of the nanoflow gradient generator and the miniaturized HPLC. Cytochrome C or BSA was first dissolved in 50 mM ammonium bicarbonate with 30% ACN (v/v) to a concentration of 10 mg/mL for each protein. Trypsin was added at a substrate-to-enzyme ratio of 100:1 to digest the proteins for 8 h at 37° C. Formic acid (1%, v/v) was added to the solution to terminate the digestion. The digests were concentrated in a vacuum concentrator to a volume of ~25 μL and stored at −20° C. The mixture was re-diluted to a final concentration of 10 mg protein per mL using 2% ACN/0.1% TFA without any additional cleanup for analysis.

Results and Discussion

Effect of Pressure on Monolith Characteristics

Applying a pressure (~1000 psi) to the monomer solution during polymerization improved the performance of monolith. FIGS. 19A-19D show SEM (Scanning Electron Microscope) images of the monoliths prepared without (FIGS. 19A-19B) and with (FIGS. 19C-19D) the pressure. Monoliths with smaller pores and lower porosities were formed when polymerization occurred under pressure. The effective pore diameters of around 500 nm and porosities of around 36.3% were achieved in this study which were useful for high-pressure EOP construction. In the presence of this pressure, the monolith could be prepared reproducibly, and the pore size could be manipulated by adjusting the porogen quantities (e.g., 1-propanol and 1,4-butanediol). Without wishing to be bound by theory, it is believed that the smaller pore sizes obtained under pressure was due to the suppression of the microbubble formation.

Theoretical Consideration of Bi-Egg

When an EOP is utilized, the actual pump pressure (P) is smaller than the maximum pump pressure ($P_{max}$), because the flow rate (Q) will be greater than zero. The actual pressure output of an EOP can be expressed by $$P = P_{max} - \frac{P_{max}}{Q_{max}} Q. \tag{1}$$

For a specific monolithic EOP, the maximum pump pressure ($P_{max}$) and the maximum pump rate ($Q_{max}=Q_{eo}$, the overall electroosmotic flow in the monolith) can be expressed by $$P_{max} = \frac{32 \, \eta \mu_{eo}}{d^2} V, \text{ and} \tag{2}$$

$$Q_{max} = \frac{m\pi d^2 \mu_{eo}}{4L} V, \tag{3}$$

where, η represents the viscosity of the pump solution; $\mu_{eo}$, the electroosmotic mobility; d, the effective pore diameter; L, the length of the monolith; m, the number of equivalent pores; and V, the voltage applied across the monolith. So, the actual pump pressure can be expressed by $$P = \alpha V - \beta Q, \tag{4}$$

where $$\alpha = \frac{32 \, \eta \mu_{eo}}{d^2}, \text{ and } \beta = \frac{128 \, \eta L}{m\pi d^4},$$

and these constants can be obtained experimentally after $P_{max}$ and $Q_{max}$ are measured under any given voltage ($V_0$):

$$\alpha = \frac{P_{max}}{V_0}, \text{ and } \beta = \frac{P_{max}}{Q_{max}}.$$

In the HPLC 350, as configured in FIG. 18, the eluent flow rate through the column ($Q_0$) equals to the sum of the flow rates of EOP A ($Q_a$) and EOP B ($Q_b$), i.e., $Q_0=Q_a+Q_b$. Because the pressure drops across all connection capillaries can be neglected, the pressure on the column ($P_0$) equals to the pressure on EOP A or EOP B, i.e., $P_0=P_a=P_b$.

When MA and MB are mixed, the eluent concentration can be expressed by $$C = \frac{[MA]Q_a + [MB]Q_b}{Q_0} = [MA] - \frac{Q_b}{Q_0}([MA] - [MB]), \text{ and} \tag{5a}$$

$$C = \frac{[MA]Q_a + [MB]Q_b}{Q_0} = [MB] - \frac{Q_a}{Q_0}([MB] - [MA]), \tag{5b}$$

where [MA] and [MB] are eluent concentration in MA and MB.

Combining equations 4 and 5, we have $$V_a = \frac{P_0}{\alpha_a} + \frac{\beta_a Q_0([MB] - C)}{\alpha_a([MB] - [MA])}, \text{ and} \tag{6a}$$

$$V_b = \frac{P_0}{\alpha_a} + \frac{\beta_b Q_0([MB] - C)}{\alpha_b([MA] - [MB])}. \tag{6b}$$

There are specific $V_a$ and $V_b$ values for any specific C (a time dependent function). Therefore, by properly programming $V_a$ and $V_b$ as function of time, we can obtain any gradient profile.

Performance of Bi-Egg

In certain embodiments, the EOP is characterized after being prepared. FIGS. 20A-20D show the characterization of the EOPs used in this work. The maximum flow rate and pressure increased with the voltage applied on the EOP, good linear relationships were obtained ($R^2>0.99$, FIGS. 20A, and 20B). When a high voltage of 10 kV was applied, the EOP could generate a maximum flow rate of 450 nL/min, a maximum output pressure of 5600 psi, which was about 3× higher than that of previous EOPs. Based on these results, we computed $\alpha_a$=558.2 psi/kV and $\beta_a$=14.0 psi·min/nL for EOP A, $\alpha_b$=582.6 psi/kV, and $\beta_b$=14.7 psi·min/nL for EOP B.

After measuring the maximum pressure and maximum flow rate under a given voltage, we obtained the working curve (FIG. 20C) of the EOP. We then determined the separation pressure ($P_0$) to be □1500 psi under a pre-set flow rate ($Q_0$) of 200 nL/min. We also set [MA]=2% ACN and [MB]=90% ACN, both in 0.1% TFA. $V_a$ and $V_b$ were programmed according to equations 6a and 6b. In this experiment, when $V_a$ varied from 7.5 kV to 4.2 kV and $V_b$ changed from 2.8 kV to 6.1 kV, the gradient profile changed from 5% ACN to 65% ACN.

Figure 21:
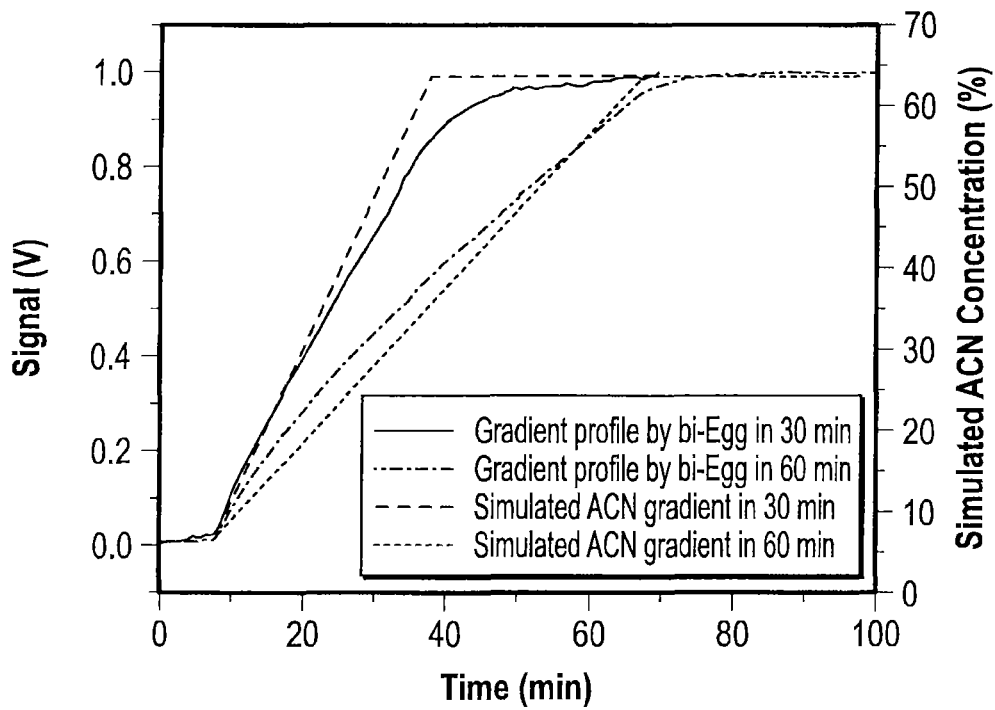
FIG. 21 depicts typical gradient profiles by the bi-Egg embodiment of FIG. 18.

FIG. 21 shows two gradient profiles (solid lines) produced by the bi-Egg. These profiles are relatively smooth and linear and are comparable to those generated by a commercial Agilent 1200 HPLC system. The dashed lines display the calculated results from equations 6a and 6b without considering diffusion and dispersion. The experimental data matched the calculated results well, and the actual profiles followed the programmed profiles closely. Technically speaking, by programming $V_a$ and $V_b$ properly, virtually any desired gradient profiles can be obtained.

Integration of a Bi-Egg into a Miniaturized HPLC for Peptide Separation

Figure 22A:
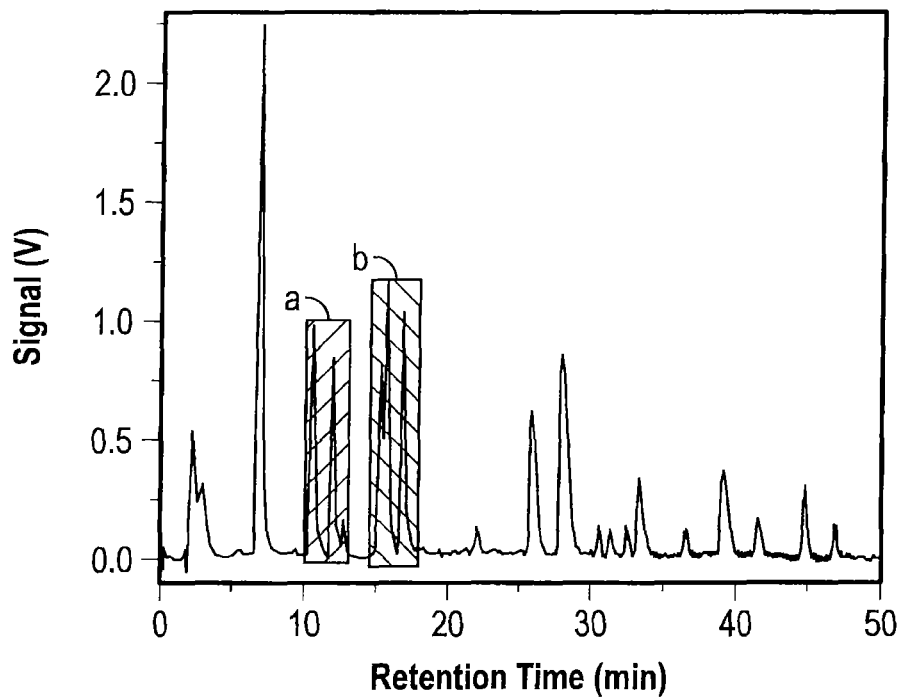
FIGS. 22a-22D depict chromatograms demonstrating performance comparisons between the binary EOP gradient generator of FIG. 18 and a prior art HPLC system.
Figure 22B:
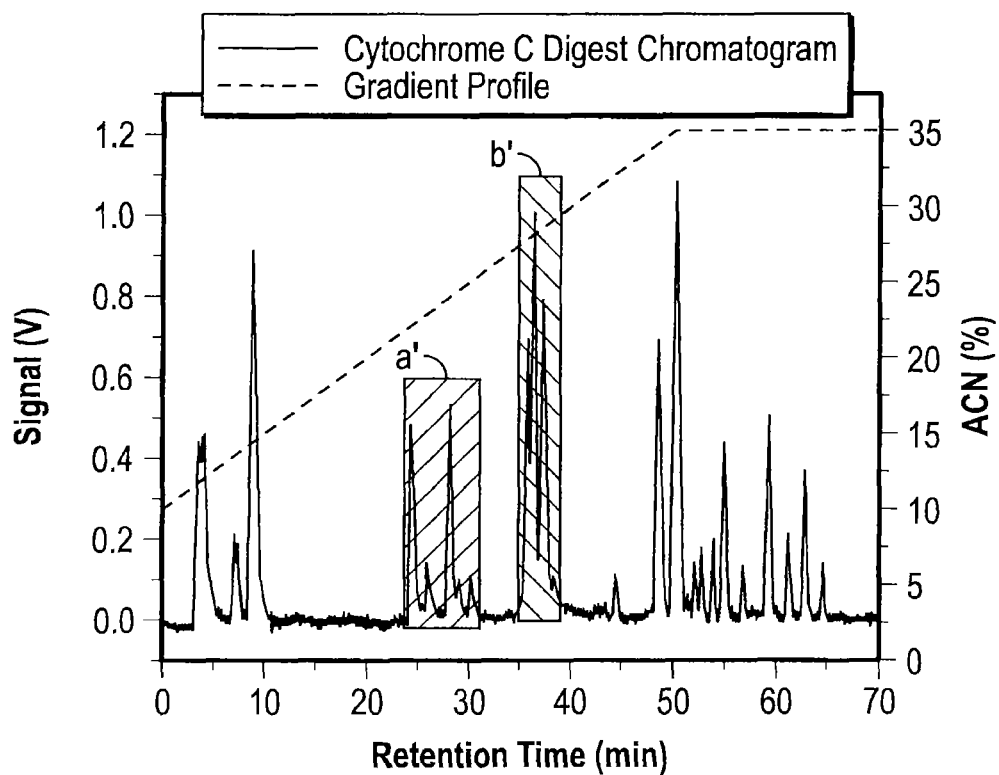
Figure 22C:
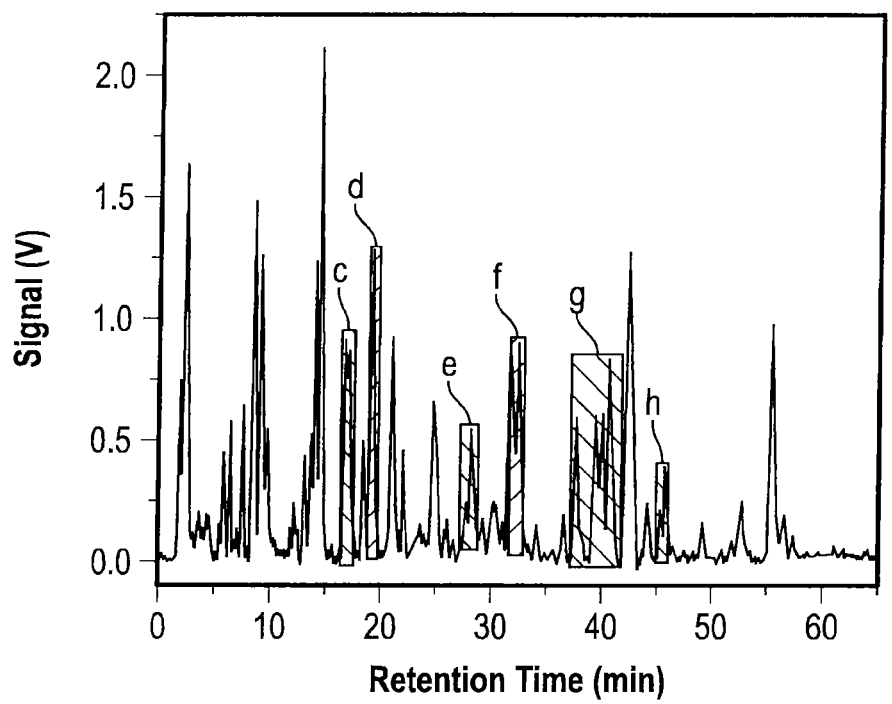
Figure 22D:
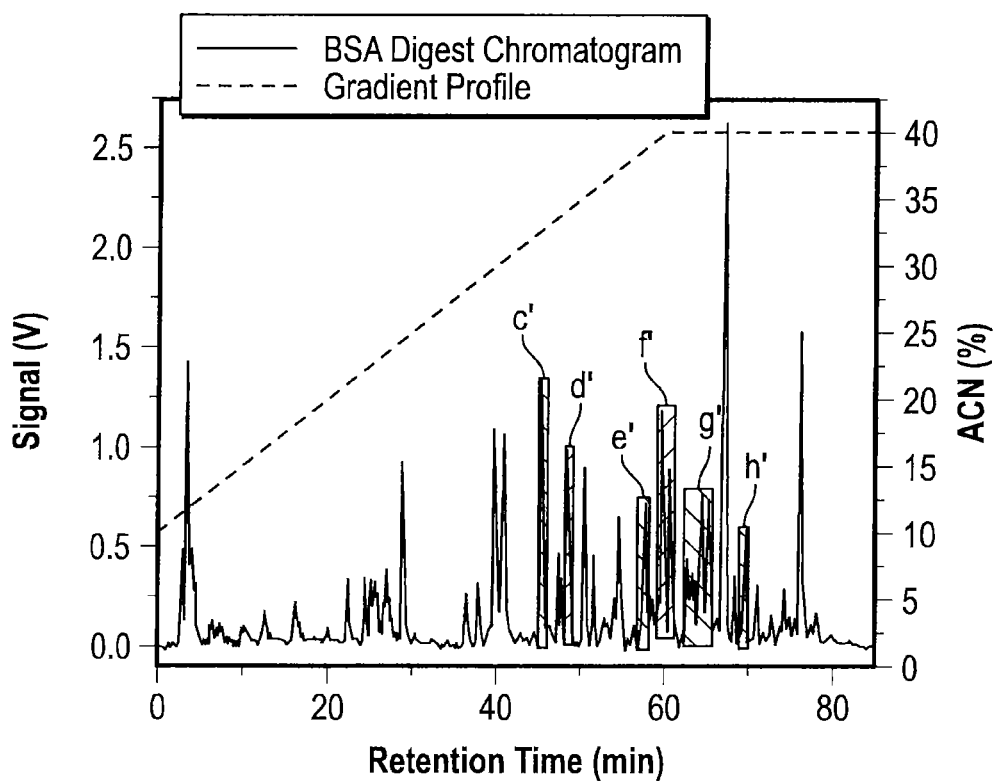

After the bi-Egg was characterized, it was integrated into a miniaturized nanoflow HPLC system as shown in FIG. 18 and utilized the HPLC for separations of peptides from trypsin-digested cytochrome C and BSA. FIGS. 22A and 22C present the separation results from bi-Egg HPLC, while FIGS. 22B and 22D present the results from an Agilent 1200 HPLC under similar conditions (e.g., 200 nL/min). As can be seen, most of the peptides were well resolved in both systems. We could identify □30 peaks in the chromatogram of cytochrome C and ~60 peaks for the chromatogram of BSA. However, we did see differences between the two systems. For example, resolutions for some peaks (e.g., peak groups b vs b', c vs c', e vs e', g vs g', and h vs h') in FIGS. 22A and 22C were higher than those in FIGS. 22B and 22D, while resolutions for some other peaks (e.g. peak groups a vs a', d vs d', and f vs f') in FIGS. 22A and 22C were lower than those in FIGS. 22B and 22D. Also, the retention times in FIGS. 22A and 22C were shorter than those in FIGS. 22B and 22D. Without wishing to be bound by theory, possibly, the bi-Egg had short delay time, which made the less retained peaks come out sooner than that of Agilent 1200 HPLC. Another reason could be Joule heating that increased the pump solution temperature at a very high voltage (at either extremes of the gradient profile).

As indicated above, a new pressure-assisted protocol to prepare monoliths for EOP construction was developed. This process resulted in the production of more efficient, reliable and reproducible EOPs. The EOPs are used in a binary-EOP gradient generator which is used to construct a miniaturized nanoflow HPLC. The resulting binary EOP-gradient generator can be built at a fraction of the cost of the tens of thousand dollars necessary to build a commercial nanoflow gradient generator available prior to the presently disclosed inventive concepts. Equations, described herein, have also been developed for tuning the gradient profiles. As long as the EOPs are properly characterized, a desired gradient profile can be obtained automatically by adjusting the voltages applied on the EOPs via computer program. As noted, the miniaturized nanoflow HPLC described herein is demonstrated to provide comparable results in separating complex peptide samples, providing comparative resolutions and peak capacities with respect to those obtained from a commercial HPLC system Agilent 1200 HPLC.

In certain non-limiting embodiments, the presently disclosed inventive concepts include an electroosmotic pump unit constructed of (1) a first pump element including a first tube having a first fluid inlet, a first fluid outlet, and a first inner surface, the first fluid inlet being electrically-grounded, and a first porous monolith positioned within the first tube between the first fluid inlet and the first fluid outlet and immobilized therein, the first porous monolith provided with a plurality of open pores having net positive surface charges; and (2) a second pump element including a second tube having a second fluid inlet, a second fluid outlet, and a second inner surface, the second fluid inlet fluidly coupled with the first fluid outlet of the first pump element and the second fluid outlet being electrically grounded, and a second porous monolith positioned within the second tube between the second fluid inlet and the second fluid outlet and immobilized therein, the second porous monolith provided with a plurality of open pores having net negative surface charges. An electrode is electrically coupled to the first fluid outlet and the second fluid inlet for applying an electrical voltage across the first and second porous monoliths, wherein when the electric voltage is applied thereto, a fluid supplied to the first fluid inlet of the first pump element is caused to flow therefrom at a first pressure into the second pump element and therefrom via the second fluid outlet at a second pressure so that the fluid is discharged from the second fluid outlet at a third pressure which exceeds at least one of the first pressure and the second pressure. The first porous monolith may be bonded to the first inner surface of the first tube and/or the second porous monolith may be bonded to the second inner surface of the second tube. The first pump element may have an electroosmotic mobility which is substantially equal to an electroosmotic mobility of the second pump element. The electrode may comprise a conductive gel immobilized inside a capillary wherein the electrode is bubbleless. The first porous monolith and/or the second porous monolith may have, but are not limited to, a porosity in a range of about 1% to about 90%. The open pores of the first or second porous monolith may have, but are not limited to, an average size in a range of about 0.4 μm to about 2 μm.

Another non-limiting embodiment of the presently disclosed inventive concepts is an electroosmotic pump assembly comprising a plurality of electroosmotic pump units connected in series, wherein each electroosmotic pump unit is constructed of (1) a first pump element including a first tube having a first fluid inlet, a first fluid outlet, and a first inner surface, the first fluid inlet being electrically-grounded, and a first porous monolith positioned within the first tube between the first fluid inlet and the first fluid outlet and immobilized therein, the first porous monolith provided with a plurality of open pores having net positive surface charges, and (2) a second pump element including a second tube having a second fluid inlet, a second fluid outlet, and a second inner surface, the second fluid inlet fluidly coupled with the first fluid outlet of the first pump element and the second fluid outlet being electrically grounded, and a second porous monolith positioned within the second tube between the second fluid inlet and the second fluid outlet and immobilized therein, the second porous monolith provided with a plurality of open pores having net negative surface charges. An electrode is electrically coupled to the first fluid outlet and the second fluid inlet for applying an electrical voltage across the first and second porous monoliths, wherein when the electric voltage is applied thereto, a fluid supplied to the first fluid inlet of the first pump element is caused to flow therefrom at a first pressure into the second pump element and therefrom via the second fluid outlet at a second pressure so that the fluid is discharged from the second fluid outlet at a third pressure which exceeds at least one of the first pressure and the second pressure.

Another non-limiting embodiment of the presently disclosed inventive concepts is an electroosmotic pump assembly comprising at least a first electroosmotic pump unit and a second electroosmotic pump unit. The first electroosmotic pump unit is constructed of (1) a first pump element including a first tube having a first fluid inlet, a first fluid outlet, and a first inner surface, the first fluid inlet being electrically-grounded and a first porous monolith positioned within the first tube between the first fluid inlet and the first fluid outlet and immobilized therein, the first porous monolith provided with a plurality of open pores having net positive surface charges, and (2) a second pump element including a second tube having a second fluid inlet, a second fluid outlet, and a second inner surface, the second fluid inlet fluidly coupled with the first fluid outlet of the first pump element and the second fluid outlet being electrically grounded, and a second porous monolith positioned within the second tube between the second fluid inlet and the second fluid outlet and immobilized therein, the second porous monolith provided with a plurality of open pores having net negative surface charges. A first electrode is electrically coupled to the first fluid outlet and the second fluid inlet for applying an electrical voltage across the first and second porous monoliths, wherein when the electric voltage is applied thereto, a fluid supplied to first fluid inlet of the first pump element is caused to flow therefrom at a first pressure into the second pump elements and therefrom via the second fluid outlet at a second pressure so that the fluid is discharged from the second fluid outlet at a third pressure which exceeds at least one of the first pressure and the second pressure.

The second electroosmotic pump unit is constructed of a third pump element including a third tube having a third fluid inlet, a third fluid outlet, and a third inner surface, the third fluid inlet being electrically-grounded and fluidly coupled with the second fluid outlet, and a third porous monolith positioned within the third tube between the third fluid inlet and the third fluid outlet and immobilized therein, the third porous monolith provided with a plurality of open pores having net positive surface charges, and a fourth pump element including a fourth tube having a fourth fluid inlet, a fourth fluid outlet, and a fourth inner surface, the fourth fluid inlet fluidly coupled with the third fluid outlet of the third pump element and the fourth fluid outlet being electrically grounded, and a fourth porous monolith positioned within the fourth tube between the fourth fluid inlet and the fourth fluid outlet and immobilized therein, the fourth porous monolith provided with a plurality of open pores having net negative surface charges. A second electrode electrically is coupled to the third fluid outlet and the fourth fluid inlet for applying an electrical voltage across the third and fourth monoliths, wherein when the electric voltage is applied thereto, a fluid supplied to the third fluid inlet of the third pump element is caused to flow therefrom at a fourth pressure into the fourth pump element and therefrom via the fourth fluid outlet at a fifth pressure so that the fluid is discharged from the fourth fluid outlet at a sixth pressure which exceeds at least one of the fourth pressure and the fifth pressure. The first porous monolith may be bonded to the first inner surface of the first tube and/or the second porous monolith may be bonded to the second inner surface of the second tube, and/or the third porous monolith may be bonded to the third inner surface of the third tube, and/or the fourth porous monolith may be bonded to the fourth inner surface of the fourth tube. The first pump element may have an electroosmotic mobility which is substantially equal to an electroosmotic mobility of the second pump element. The third pump element may have an electroosmotic mobility which is substantially equal to an electroosmotic mobility of the fourth pump element. The first and second electrodes may comprise a conductive gel immobilized inside a capillary wherein the first and second electrodes are bubbleless. The first porous monolith and/or the second porous monolith and/or the third porous monolith and/or the fourth porous monolith may have, but are not limited to, porosities in a range of about 1% to about 90%. The open pores of the first, and/or second, and/or third, and/or fourth porous monolith may have, but are not limited to, average sizes in a range of about 0.4 μm to about 2 μm.

Another non-limiting embodiment of the presently disclosed inventive concepts is a method of pumping a volume of a fluid, comprising, fluidly coupling a fluid source including a volume of a fluid with an electroosmotic pump unit, the electroosmotic pump unit comprising (1) at least a first pump element including a first tube having a first fluid inlet, a first fluid outlet, and a first inner surface, the first fluid inlet being electrically-grounded and fluidly coupled with the fluid source, and a first porous monolith positioned within the first tube between the first fluid inlet and the first fluid outlet and immobilized therein, the first porous monolith provided with a plurality of open pores having net positive surface charges, and (2) at least a second pump element including, a second tube having a second fluid inlet, a second fluid outlet, and a second inner surface, the second fluid inlet fluidly coupled with the first fluid outlet of the first pump element and the second fluid outlet being electrically grounded, and a second porous monolith positioned within the second tube between the second fluid inlet and the second fluid outlet and immobilized therein, the second porous monolith provided with a plurality of open pores having net negative surface charges, wherein an electrode is electrically coupled to the first fluid outlet and the second fluid inlet for applying an electrical voltage across the first and second porous monoliths; and providing an electrical voltage to the electrode such that a volume of the fluid supplied to the first fluid inlet of the first pump element flows therefrom at a first pressure into the second pump element and therefrom via the second fluid outlet at a second pressure so that the fluid is discharged from the second fluid outlet at a third pressure which exceeds at least one of the first pressure and the second pressure.

In one non-limiting embodiment, the presently disclosed inventive concepts include an electroosmotic pump unit constructed of (1) a first pump element including a first tube having a first fluid inlet, a first fluid outlet, and a first inner surface, the first fluid outlet being electrically-grounded; and a first porous monolith positioned within and bonded to the first inner surface of the first tube between the first fluid inlet and the first fluid outlet, the first porous monolith provided with a plurality of open pores having at least one of net positive surface charges and net negative surface charges; and (2) a second pump element including a second tube having a second fluid inlet, a second fluid outlet, and a second inner surface, the second fluid outlet fluidly coupled with the second fluid outlet of the first pump element and the second fluid outlet being electrically grounded; and a second porous monolith positioned within and bonded to the second inner surface of the second tube between the second fluid inlet and the first fluid outlet, the second porous monolith provided with a plurality of open pores having at least one of net positive surface charges and net negative surface charges. A first electrode is electrically coupled to the first fluid inlet for applying an electrical voltage across the first porous monolith, wherein when the electric voltage is applied thereto, a fluid supplied to the first fluid inlet of the first pump element is caused to flow therefrom; and a second electrode is electrically coupled to the second fluid inlet for applying an electrical voltage across the second porous monolith, wherein when the electric voltage is applied thereto, a fluid supplied to the second fluid inlet of the second pump element is caused to flow therefrom. This EOP unit may be utilized for example to pump a fluid into an HPLC unit for analysis of a substance in the fluid.

In any of the EOP embodiments disclosed herein, the polymerization reaction used to form the monolith material may be allowed to proceed under pressure, as described elsewhere herein.

From the above description, it is clear that the inventive concepts disclosed herein is well adapted to carry out the objects and to attain the advantages mentioned herein as well as those inherent in the inventive concepts disclosed herein. While particular embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. An electroosmotic pump unit, comprising:
   a first pump element including:
      a first tube having a first fluid inlet, a first fluid outlet, and a first inner surface, the first fluid inlet being electrically grounded; and
      a first porous monolith positioned within the first tube between the first fluid inlet and the first fluid outlet and immobilized therein, the first porous monolith provided with a plurality of open pores having net positive surface charges;
   a second pump element including:
      a second tube having a second fluid inlet, a second fluid outlet, and a second inner surface, the second fluid inlet fluidly coupled with the first fluid outlet of the first pump element and the second fluid outlet being electrically grounded; and
      a second porous monolith positioned within the second tube between the second fluid inlet and the second fluid outlet and immobilized therein, the second porous monolith provided with a plurality of open pores having net negative surface charges; and
   an electrode electrically connected to the first fluid outlet and the second fluid inlet for applying an electrical voltage across the first and second porous monoliths, wherein when the electrical voltage is applied thereto, a fluid supplied to the first fluid inlet of the first pump element is caused to flow through the first pump element at a first pressure and through the second pump element at a second pressure after which the fluid is discharged from the second fluid outlet at a third pressure which exceeds at least one of the first pressure and the second pressure.

2. The electroosmotic pump unit of claim 1, wherein the first porous monolith is bonded to the first inner surface of the first tube.

3. The electroosmotic pump unit of claim 1, wherein the second porous monolith is bonded to the second inner surface of the second tube.

4. The electroosmotic pump unit of claim 1, wherein the first pump element has an electroosmotic mobility which is substantially equal to an electroosmotic mobility of the second pump element.

5. The electroosmotic pump unit of claim 1, wherein the electrode comprises a conductive gel immobilized inside a capillary wherein the electrode blocks bulk flow but permits the passage of ions.

6. The electroosmotic pump unit of claim 1, wherein the first porous monolith has a porosity in a range of about 1% to about 90%.

7. The electroosmotic pump unit of claim 6, wherein the plurality of open pores of the first porous monolith have an average size in a range of about 0.4 µm to about 2 µm.

8. The electroosmotic pump unit of claim 1, wherein the second porous monolith has a porosity in a range of about 1% to about 90%.

9. The electroosmotic pump unit of claim 8, wherein the plurality of open pores of the second porous monolith have an average size in a range of about 0.4 µm to about 2 µm.

10. An electroosmotic pump assembly, comprising:
    a plurality of electroosmotic pump units connected in series, each electroosmotic pump unit comprising:
       a first pump element including:
          a first tube having a first fluid inlet, a first fluid outlet, and a first inner surface, the first fluid inlet being electrically grounded; and
          a first porous monolith positioned within the first tube between the first fluid inlet and the first fluid outlet and immobilized therein, the first porous monolith provided with a plurality of open pores having net positive surface charges;
       a second pump element including:
          a second tube having a second fluid inlet, a second fluid outlet, and a second inner surface, the second fluid inlet fluidly coupled with the first fluid outlet of the first pump element and the second fluid outlet being electrically grounded; and
          a second porous monolith positioned within the second tube between the second fluid inlet and the second fluid outlet and immobilized therein, the second porous monolith provided with a plurality of open pores having net negative surface charges; and
       an electrode electrically connected to the first fluid outlet and the second fluid inlet for applying an electrical voltage across the first and second porous monoliths, wherein when the electrical voltage is applied thereto, a fluid supplied to the first fluid inlet of the first pump element is caused to flow through the first pump element at a first pressure and through the second pump element at a second pressure after which the fluid is discharged from the second fluid outlet at a third pressure which exceeds at least one of the first pressure and the second pressure.

11. An electroosmotic pump assembly, comprising:
    a first electroosmotic pump unit, including:

a first pump element including:
  a first tube having a first fluid inlet, a first fluid outlet, and a first inner surface, the first fluid inlet being electrically grounded; and
  a first porous monolith positioned within the first tube between the first fluid inlet and the first fluid outlet and immobilized therein, the first porous monolith provided with a plurality of open pores having net positive surface charges;
a second pump element including:
  a second tube having a second fluid inlet, a second fluid outlet, and a second inner surface, the second fluid inlet fluidly coupled with the first fluid outlet of the first pump element and the second fluid outlet being electrically grounded; and
  a second porous monolith positioned within the second tube between the second fluid inlet and the second fluid outlet and immobilized therein, the second porous monolith provided with a plurality of open pores having net negative surface charges; and
a first electrode electrically connected to the first fluid outlet and the second fluid inlet for applying an electrical voltage across the first and second porous monoliths, wherein when the electrical voltage is applied thereto, a fluid supplied to the first fluid inlet of the first pump element is caused to flow through the first pump element at a first pressure and through the second pump element at a second pressure after which the fluid is discharged from the second fluid outlet at a third pressure which exceeds at least one of the first pressure and the second pressure;
a second electroosmotic pump unit including:
a third pump element including:
  a third tube having a third fluid inlet, a third fluid outlet, and a third inner surface, the third fluid inlet being electrically grounded and fluidly coupled with the second fluid outlet; and
  a third porous monolith positioned within the third tube between the third fluid inlet and the third fluid outlet and immobilized therein, the third porous monolith provided with a plurality of open pores having net positive surface charges;
a fourth pump element including:
  a fourth tube having a fourth fluid inlet, a fourth fluid outlet, and a fourth inner surface, the fourth fluid inlet fluidly coupled with the third fluid outlet of the third pump element and the fourth fluid outlet being electrically grounded; and
  a fourth porous monolith positioned within the fourth tube between the fourth fluid inlet and the fourth fluid outlet and immobilized therein, the fourth porous monolith provided with a plurality of open pores having net negative surface charges; and
a second electrode electrically connected to the third fluid outlet and the fourth fluid inlet for applying an electrical voltage across the third and fourth porous monoliths, wherein when the electrical voltage is applied thereto, a fluid supplied to the third fluid inlet of the third pump element is caused to flow through the third pump element at a fourth pressure and through the fourth pump element at a fifth pressure after which the fluid is discharged from the fourth fluid outlet at a sixth pressure which exceeds at least one of the fourth pressure and the fifth pressure.

12. The electroosmotic pump assembly of claim 11, wherein the first porous monolith is bonded to the first inner surface of the first tube.

13. The electroosmotic pump assembly of claim 12, wherein the third porous monolith is bonded to the third inner surface of the third tube.

14. The electroosmotic pump assembly of claim 11, wherein the second porous monolith is bonded to the second inner surface of the second tube.

15. The electroosmotic pump assembly of claim 14, wherein the fourth porous monolith is bonded to the fourth inner surface of the fourth tube.

16. The electroosmotic pump assembly of claim 11, wherein the first pump element has an electroosmotic mobility which is substantially equal to an electroosmotic mobility of the second pump element.

17. The electroosmotic pump assembly of claim 16, wherein the third pump element has an electroosmotic mobility which is substantially equal to an electroosmotic mobility of the fourth pump element.

18. The electroosmotic pump assembly of claim 11, wherein the first and second electrodes comprise a conductive gel immobilized inside a capillary wherein the first and second electrodes block bulk flow but permit the passage of ions.

19. The electroosmotic pump assembly of claim 11, wherein the first and third porous monoliths have porosities in a range of about 1% to about 90%.

20. The electroosmotic pump assembly of claim 19, wherein the plurality of open pores of the first porous monolith have an average pore size in a range of about 0.4 μm to about 2 μm.

21. The electroosmotic pump assembly of claim 19, wherein the plurality of open pores of the third porous monolith have an average pore size in a range of about 0.4 μm to about 2 μm.

22. The electroosmotic pump assembly of claim 11, wherein the second and fourth porous monoliths have porosities in a range of about 1% to about 90%.

23. The electroosmotic pump assembly of claim 22, wherein the plurality of open pores of the second porous monolith have an average size in a range of about 0.4 μm to about 2 μm.

24. The electroosmotic pump assembly of claim 22, wherein the plurality of open pores of the fourth porous monolith have an average size in a range of about 0.4 μm to about 2 μm.

25. A method of pumping a volume of a fluid, comprising:
  fluidly coupling a fluid source including a volume of a fluid with an electroosmotic pump unit, the electroosmotic pump unit comprising
  a first pump element including:
    a first tube having a first fluid inlet, a first fluid outlet, and a first inner surface, the first fluid inlet being electrically grounded and fluidly coupled with the fluid source; and
    a first porous monolith positioned within the first tube between the first fluid inlet and the first fluid outlet and immobilized therein, the first porous monolith provided with a plurality of open pores having net positive surface charges;
  a second pump element including:
    a second tube having a second fluid inlet, a second fluid outlet, and a second inner surface, the second fluid inlet fluidly coupled with the first fluid outlet of the first pump element and the second fluid outlet being electrically grounded; and a second porous monolith positioned within the second tube between the second fluid inlet and the second fluid outlet and immobilized therein, the second porous monolith provided with a plurality of open pores having net negative surface charges; and an electrode electrically connected to the first fluid outlet and the second fluid inlet for applying an electrical voltage across the first and second porous monoliths; and providing an electrical voltage to the electrode such that a volume of the fluid supplied to the first fluid inlet of the first pump element flows through the first pump element at a first pressure and through the second pump element at a second pressure after which the fluid is discharged from the second fluid outlet at a third pressure which exceeds at least one of the first pressure and the second pressure.

* * * * *